(12) United States Patent
Smith et al.

(10) Patent No.: US 9,043,540 B2
(45) Date of Patent: May 26, 2015

(54) SYSTEMS AND METHODS FOR TRACKING BLOCK OWNERSHIP

(75) Inventors: Sean Smith, Sunnyvale, CA (US); Anureita Rao, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 170 days.

(21) Appl. No.: 13/436,167

(22) Filed: Mar. 30, 2012

(65) Prior Publication Data

US 2013/0262758 A1   Oct. 3, 2013

(51) Int. Cl.
*G06F 3/06* (2006.01)

(52) U.S. Cl.
CPC .............. *G06F 3/0605* (2013.01); *G06F 3/064* (2013.01); *G06F 3/0643* (2013.01); *G06F 3/067* (2013.01)

(58) Field of Classification Search
CPC . G06F 17/30224; G06F 17/30; G06F 3/0605; G06F 3/067; G06F 3/0643; G06F 3/064; G06F 17/30067; G06F 3/0601; G06F 17/30135

USPC .......................................... 711/112, E12.001
See application file for complete search history.

(56) References Cited

U.S. PATENT DOCUMENTS 6,032,216 A * 2/2000 Schmuck et al. ............. 710/200
8,412,688 B1 * 4/2013 Armangau et al. ........... 707/695

* cited by examiner

*Primary Examiner* — Mardochee Chery
(74) *Attorney, Agent, or Firm* — LeClairRyan, a Professional Corporation

(57) ABSTRACT

Systems and methods for, among other things, providing a storage system which allows for efficient tracking of in-use storage disk blocks using "sharing nodes". Disk blocks are a result of low-level formatting, which breaks up the total storage capacity into a set number of blocks. High-level formatting of the disk creates the file system, and part of the file system may create metadata known as inodes, and associate an inode with each file, such that an inode tracks the disk blocks in use by that file, pointing from the file to a set of blocks. An S-node generator creates another type of metadata, complementary to an inode, known as an S-node data structure, such that an S-node data structure is associated with a block, and tracks the set of inodes using the block, pointing from the disk blocks to inodes.

21 Claims, 19 Drawing Sheets

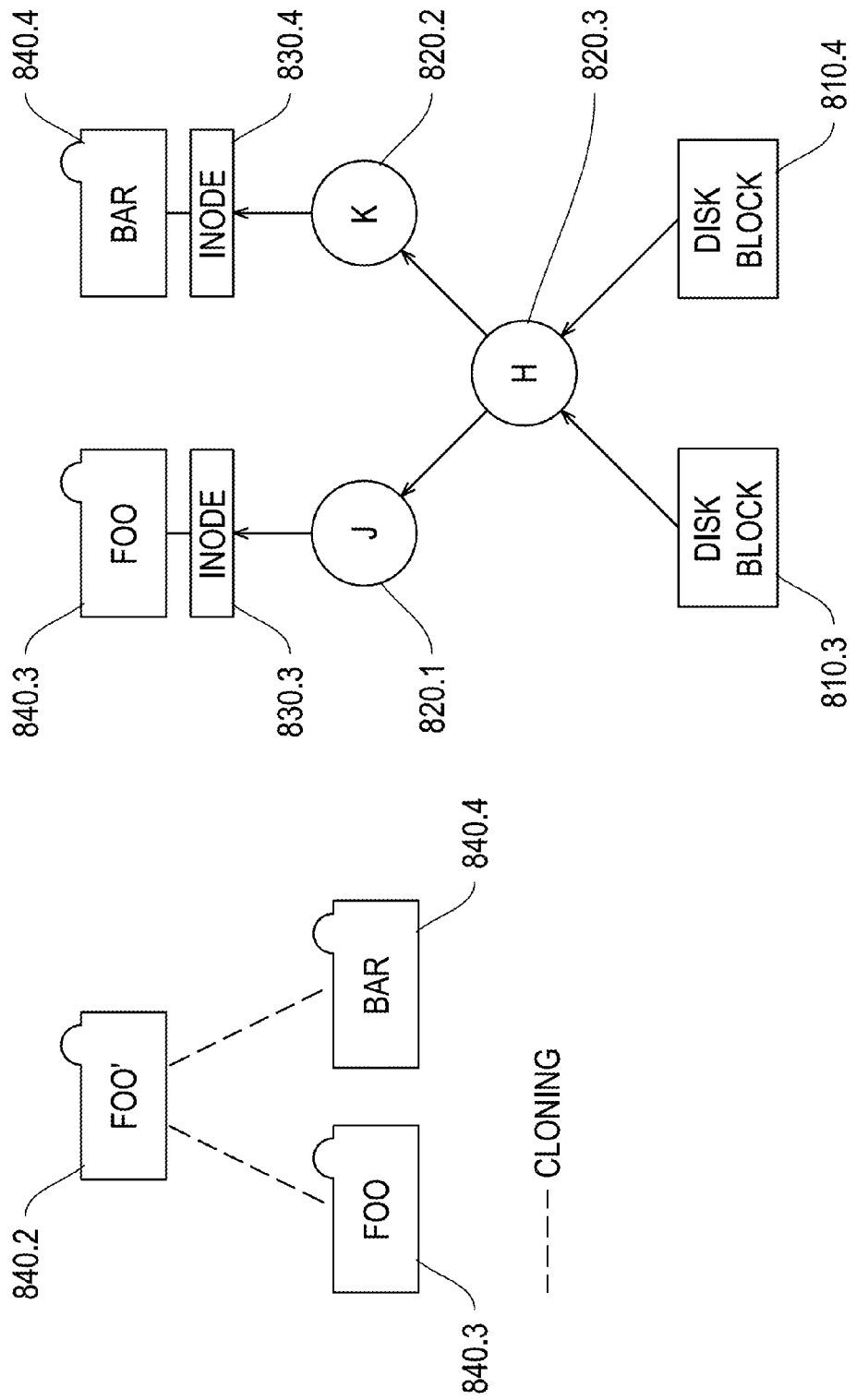

US 9,043,540 B2

SYSTEMS AND METHODS FOR TRACKING BLOCK OWNERSHIP

FIELD OF THE INVENTION

The systems and methods described herein relate to storage systems, and particularly, to efficient storage and maintenance of information on primary storage hardware to track disk block ownership.

BACKGROUND

A storage system is a processing system adapted to store and retrieve information/data on storage devices, such as disks, or other forms of primary storage. Typically, the storage system includes a storage operating system that implements a file system to organize information into a hierarchical structure of directories and files. Each file typically comprises a set of data blocks, and each directory may be a specially-formatted file in which information about other files and directories are stored.

The storage operating system generally refers to the computer-executable code operable on a storage system that manages data access and access requests (read or write requests requiring input/output operations) and supports file system semantics in implementations involving storage systems. The Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system configured for storage applications.

Storage is typically provided as one or more storage volumes that comprise physical storage devices, defining an overall logical arrangement of storage space. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents by reading and writing data to the storage system.

An application, server or device may "connect" to the storage system over a computer network, such as a shared local area network (LAN), wide area network (WAN), or virtual private network (VPN) implemented over a public network such as the Internet. Access requests (read or write requests) travel across the network to the storage system for accessing data stored on the storage system.

The file system interfaces with the storage system hardware using a form of file node data structure metadata known as index nodes, which can, in one embodiment, be inodes, and relate a storage volume's files to the physical storage hardware. Inodes act as pointers to the physical disk blocks used by a file. The ability to share blocks among files, implemented by pointing multiple inodes to each block, allows the virtual storage capacity of the storage system to grow far beyond the actual physical space available on the disks, but also means that deleting a file that is sharing its disk blocks with others will not free up any more physical storage space on the disk.

Currently, file systems track in-use disk blocks in the active file system by marking the first use of a disk block in an active map, and tracking subsequent use of that same disk block by incrementing a block reference count in the map. However, this map update method is complicated to implement, both in terms of code and metadata, and provides limited information about use of disk blocks for sharing operations.

Another approach to disk block sharing was proposed by Macko et al., Tracking Back References in a Write-Anywhere File System, USENIX Conference on File and Storage Technologies, 2010. The proposed method tracks block references using a log. When a file makes reference to a disk block, an entry is made in a global From table. When the reference is no longer needed, a corresponding entry is made in a global To table. With a join between the From and To tables, it is possible to determine which disk blocks are currently in use. While this approach makes it relatively simple to determine which blocks are being used by the active file system, it creates a significant amount of metadata and slows down many file operations.

As such, there is a need for a more efficient method of identifying which disk blocks are being used by a given set of files.

SUMMARY OF THE INVENTION

The systems and methods described herein include, among other things, a storage system that allows for efficient tracking of in-use storage disk blocks using "sharing nodes" (henceforth S-node data structures). Disk blocks are a result of low-level formatting, which breaks up the total storage capacity into a set number of memory units (blocks). High-level formatting of the disk creates the file system, and part of the file system may create file node data structure metadata known as inodes, and associate an inode with each file, such that an inode tracks the disk blocks in use by that file, pointing from the file to a set of blocks.

A sharing node generator, henceforth an S-node generator, creates metadata, known as an S-node data structure. An S-node data structure is directly associated with a disk block, and tracks the set of inodes using a particular disk block. In contrast to an inode, which points from a file to a set of blocks used by that file, an S-node data structure points in the opposite direction, from a block, or a group of blocks, to a set of inodes using that block, or group of blocks, wherein a block or a group of blocks may be shared between multiple files, or unshared, meaning that these unshared blocks are used by a single file. The file system can use inodes to infer information about a specific block's ownership, by considering all inode pointers from files to blocks, whereas an S-node data structure can provide explicit information about which inodes are using the block, thereby allowing the file system to evaluate the sharing status of a block directly. Consequently, the systems and methods described herein may be used, among other things, to determine, with greater efficiency, the amount of actual storage space a given move or deletion operation in a file system will create.

In one aspect, the systems and methods described herein include storage systems for use with a storage device having disk blocks. These storage systems may comprise a file system having file node data structures for associating file system data with one or more respective disk blocks, and a sharing-node generator for generating an S-node data structure associated with a respective disk block and storing a relationship between the respective disk block and one or more file node data structures associated with the respective disk block, and wherein a disk block may have an associated S-node data structure, or may not be used for storing files. The S-node data structure maps a disk block on a storage device to a file node structure using the respective disk block. Optionally, the S-node generator includes a processor for detecting an allocation by the file system of a disk block for use by a file node data structure and for generating the S-node data structure in response to the block's allocation.

In another embodiment, the systems and methods described herein include a storage system which has a file system on a storage device, and this file system utilizes metadata known as inodes, and each file in the file system has an inode that tracks the disk blocks on the storage device in use by the file. Added to this inode metadata are sharing-nodes (S-node data structures), which are generated by an S-node generator, and track the set of one or more inodes using a disk block, such that information on how many files are sharing the disk block can be determined and disseminated for use by the file system.

In another embodiment, the S-node generator includes a tree generator, which organizes S-node data structures into a hierarchal structure of parent S-node data structures and children S-node data structures, and where the S-node data structures directly, and indirectly connected to disk blocks are internal S-node data structures, and the S-node data structures directly connected to inodes are leaf S-node data structures.

The storage system may use the tree generator to create a binary tree organizational structure for S-node data structures, such that an S-node data structure has either one or two children.

In another embodiment, the S-node generator includes a clone generator, which is used to create two new S-node data structures after a file is cloned, or copied.

The storage system may also include a shared block map, otherwise referred to as an S-node map, or S-map, wherein an S-map has placeholders corresponding to all disk blocks, and a placeholder can be associated with an internal S-node data structure.

In another embodiment, the storage system updates the S-map after two cloned files diverge from one another, which saves computational power required to initially clone a file.

In another embodiment, the storage system updates the S-map after deduplication.

The storage system may include a block ownership processor, which reports information on unshared disk blocks, which are disk blocks in-use by a single file. It does this by comparing the block counts maintained by inodes with the block counts maintained by S-node data structures in the S-map.

In another aspect, a method is described for tracking disk block use, wherein the method uses S-node data structures to link disk blocks to file nodes (inodes), and wherein the S-node data structures can be used to identify disk blocks that are used by single files, classified as unshared disk blocks.

In another embodiment, the method may generate S-node data structures in response to a file system operation that attempts to use new disk blocks that do not already have S-node data structures assigned to them.

In yet another embodiment, the method may respond to a file cloning operation by generating two new S-node data structures to track the original and cloned files.

In another embodiment, the method may employ a shared block map, or S-map, to track the assignment of internal S-node data structures to disk blocks, such that the S-map has a placeholder for an S-node data structure corresponding to all disk blocks available to the storage system.

The method may also include a mechanism to delay updating the shared block map until after cloned files diverge, or differ from one another, thereby saving computational resources.

The method may include a binary tree for organizing the mapping of disk blocks to inodes, where S-node data structures are organized beginning with internal S-node data structures, and the binary tree expands to children S-node data structures and terminates in leaf S-node data structures that are directly linked to inodes.

The methodology may also allow the set of inodes associated with an internal S-node data structure to be found by walking through the binary tree.

In another embodiment, the method employs a block ownership processor for reporting the status of block sharing.

The method may use the S-map to establish if the blocks associated with a file to be deleted are shared with any other files. For unshared disk blocks, a physical deletion may be performed, where a physical deletion refers to the reclamation of physical storage space on the storage system by releasing disk blocks to be overwritten by other files, and is distinct from a logical deletion, which removes a reference to the disk blocks associated with a file, but does not free up the disk blocks for use by other files until it is known that the disk blocks are not already shared with other files.

In another aspect, the systems and methods described herein relate to a storage system using disk-based storage devices, and the storage devices have a file system which uses inodes to track disk blocks associated with files, and an S-node generator to track sets of inodes using a disk block. Furthermore, a block ownership processor can determine the number of shared and unshared disk blocks by comparing inode block counts to S-node data structure block counts.

The storage system may also employ a tree generator, which organizes S-node data structures into a binary tree, such that a logical path from disk blocks to inodes can be maintained.

BRIEF DESCRIPTION OF THE DRAWINGS

The systems and methods described herein are set forth in the appended claims. However, for purpose of explanation, several embodiments are set forth in the following figures.

FIGS. 8A-8D depict the behavior of S-node data structures in file cloning operations.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

The description that follows is divided into two sections. Section I describes a storage system environment in which some embodiments operate. Section II describes storage systems that generate S-node data structures, which map disk blocks to inodes. In addition, Section II describes disk block sharing operations using S-node data structures, including file cloning, and deduplication.

I. Storage System Environment

In one embodiment, the systems and methods described herein include processes for tracking in-use system disk blocks of memory. In one practice, such processes create one or more S-node data structures, which track the set of inodes using each disk block. This tracking of disk block use, or ownership, allows for the system to accurately report the number of shared and unshared disk blocks. Two or more files may point to a disk block, if two or more files contain data that is commonly shared. In this way, a file storage system can store data that appears to be much larger than the storage device physical memory available, since data blocks common to two or more files point to the same physical disk blocks. Deleting one of these files which share certain disk blocks will therefore not free up those disk blocks for use by a new file, and under current block sharing approaches, it is computationally expensive and slow to find out how much unshared space a file is using, making it difficult to know which files to remove in order to reclaim a given amount of physical storage space on a disk. This new approach, using S-node data structures, can, in one application, be used to predict how much physical storage space will be freed by a file system operation, such as a move or deletion.

Figure 1A:
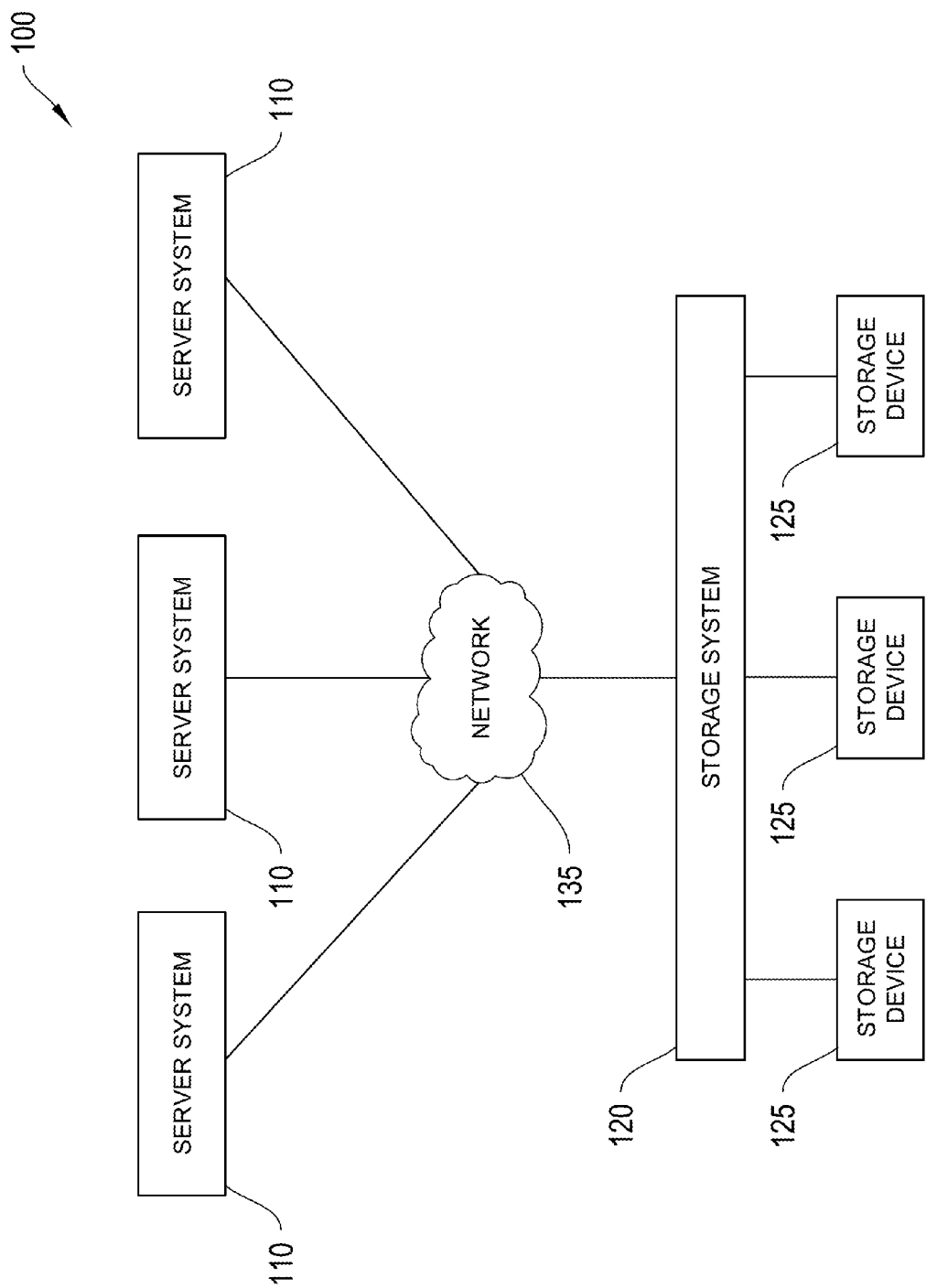
FIGS. 1A and 1B are schematic block diagrams of exemplary storage environments in which some embodiments may operate.
Figure 1B:
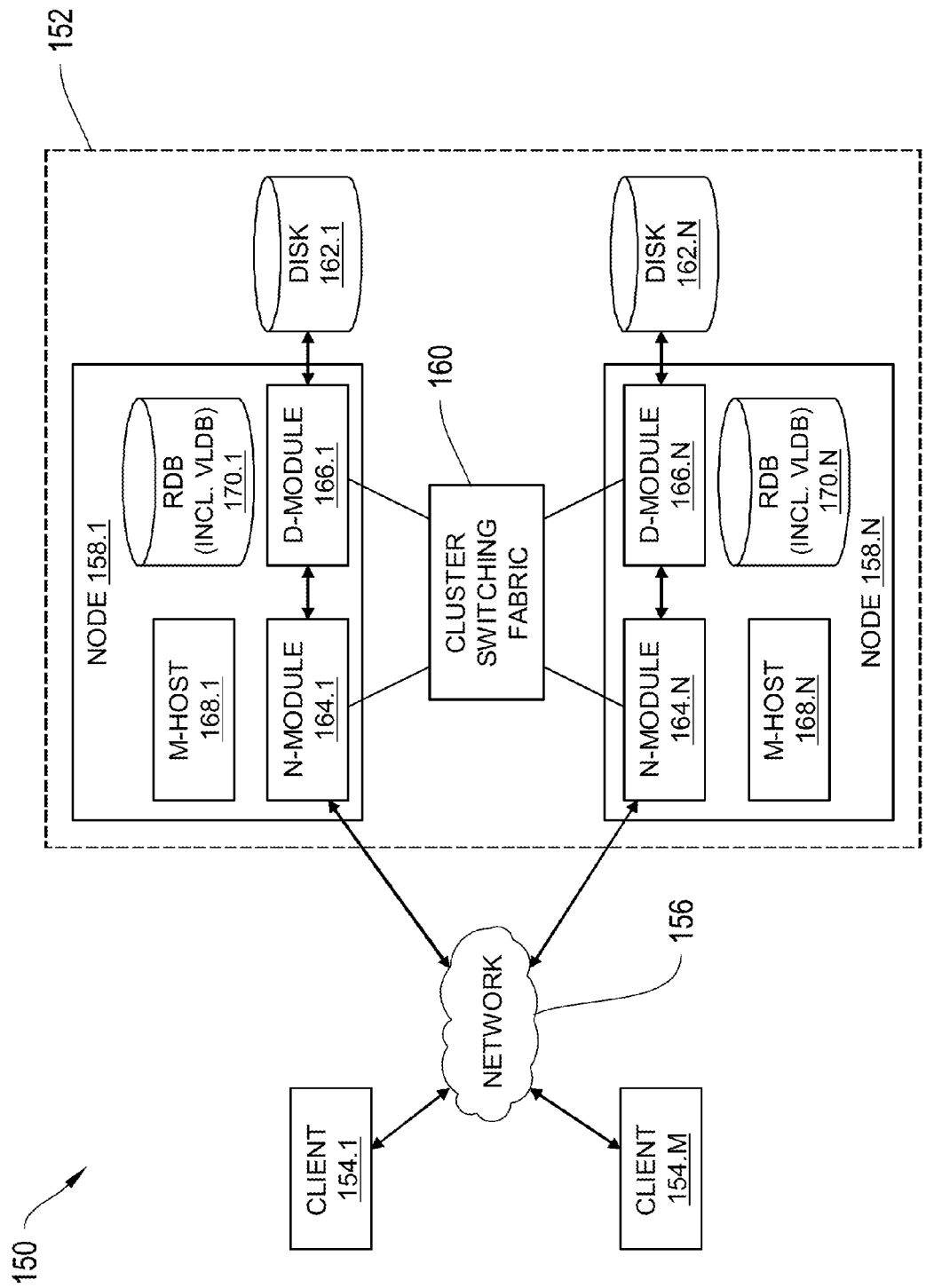

FIGS. 1A and 1B are schematic block diagrams of exemplary storage environments in which some embodiments may operate. In FIG. 1A, the environment 100 has one or more server systems 110 and a storage system 120 (having one or more storage devices 125) that are connected via a connection system 135. The connection system 135 may be a network, such as a Local Area Network (LAN), Wide Area Network (WAN), metropolitan area network (MAN), the Internet, or any other type of network or communication system suitable for transferring information between computer systems.

A server system 110 may have a computer system that employs services of the storage system 120 to store and manage data in the storage devices 125. A server system 110 may execute one or more applications that submit read/write requests for reading/writing data on the storage devices 125. Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 135. The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may store data in a set of one or more storage devices 125. A storage device 125 may be any suitable medium and may include, but is not limited to, writable storage device media, such as magnetic disk devices, video tape, optical, DVD, magnetic tape, and any other similar media adapted to store information (including data and parity information), or a semiconductor-based storage device such as a solid-state drive (SSD), or any combination of storage media. For simplicity, the description that follows uses the term "disk", which refers to a magnetic-based hard disk drive storage device, and the term "block", which refers to a sub-division of the total storage space on the hard disk drive. One of ordinary skill in the art will recognize that the description should not be limited by these terms, which can be replaced by any suitable storage device and a corresponding sub-division of storage space for that device, without departing from the spirit of the embodiments.

The storage system 120 may implement a file system that logically organizes the data as a hierarchical structure of directories and files on each storage device 125. Each file may be a set of disk blocks configured to store data, whereas each directory may be a specially-formatted file in which information about other files and directories are stored. A disk block of a file is typically a fixed-sized amount of data that comprises the smallest amount of storage space that may be accessed (read or written) on a storage device 125. The block may vary widely in data size (e.g., 1 byte, 4-kilobytes (KB), 8 KB, etc.). In some embodiments, the file system organizes file data by using index nodes, which can, in one embodiment, be inode data structures, to represent the files in the file system.

FIG. 1B depicts a network data storage environment, which can represent a more detailed view of the environment in FIG. 1A. The environment 150 includes a plurality of client systems 154 (154.1-154.M), a clustered storage server system 152, and a computer network 156 connecting the client systems 154 and the clustered storage server system 152. As shown in FIG. 1B, the clustered storage server system 152 includes a plurality of server nodes 158 (158.1-158.N), a cluster switching fabric 160, and a plurality of mass storage devices 162 (162.1-162.N), which can be disks, as henceforth assumed here to facilitate description. Alternatively, some or all of the mass storage devices 162 can be other types of storage, such as flash memory, SSDs, tape storage, etc.

Each of the nodes 158 is configured to include several modules, including an N-module 164, a D-module 166, and an M-host 168 (each of which may be implemented by using a separate software module) and an instance of, for example, a replicated database (RDB) 170. Specifically, node 158.1 includes an N-module 164.1, a D-module 166.1, and an M-host 168.1; node 158.N includes an N-module 164.N, a D-module 166.N, and an M-host 168.N; and so forth. The N-modules 164.1-164.M include functionality that enables nodes 158.1-158.N, respectively, to connect to one or more of the client systems 154 over the network 156, while the D-modules 166.1-166.N provide access to the data stored on the disks 162.1-162.N, respectively. The M-hosts 168 provide management functions for the clustered storage server system 152. Accordingly, each of the server nodes 158 in the clustered storage server arrangement provides the functionality of a storage server.

FIG. 1B illustrates that the RDB 170 is a database that is replicated throughout the cluster, i.e., each node 158 includes an instance of the RDB 170. The various instances of the RDB 170 are updated regularly to bring them into synchronization with each other. The RDB 170 provides cluster-wide storage of various information used by all of the nodes 158, including a volume location database (VLDB) (not shown). The VLDB is a database that indicates the location within the cluster of each volume in the cluster (i.e., the owning D-module 166 for each volume) and is used by the N-modules 164 to identify the appropriate D-module 166 for any given volume to which access is requested.

The nodes 158 are interconnected by a cluster switching fabric 160, which can be embodied as a Gigabit Ethernet switch, for example. The N-modules 164 and D-modules 166 cooperate to provide a highly-scalable, distributed storage system architecture of a clustered computing environment implementing exemplary embodiments of the present invention. Note that while there is shown an equal number of N-modules and D-modules in FIG. 1B, there may be differing numbers of N-modules and/or D-modules in accordance with various embodiments of the technique described here. For example, there need not be a one-to-one correspondence between the N-modules and D-modules. As such, the description of a node 158 comprising one N-module and one D-module should be understood to be illustrative only. Further, it will be understood that the client systems 154 (154.1-154.M) can also act as nodes and include data memory for storing some or all of the data set being maintained by the storage system.

Figure 2:
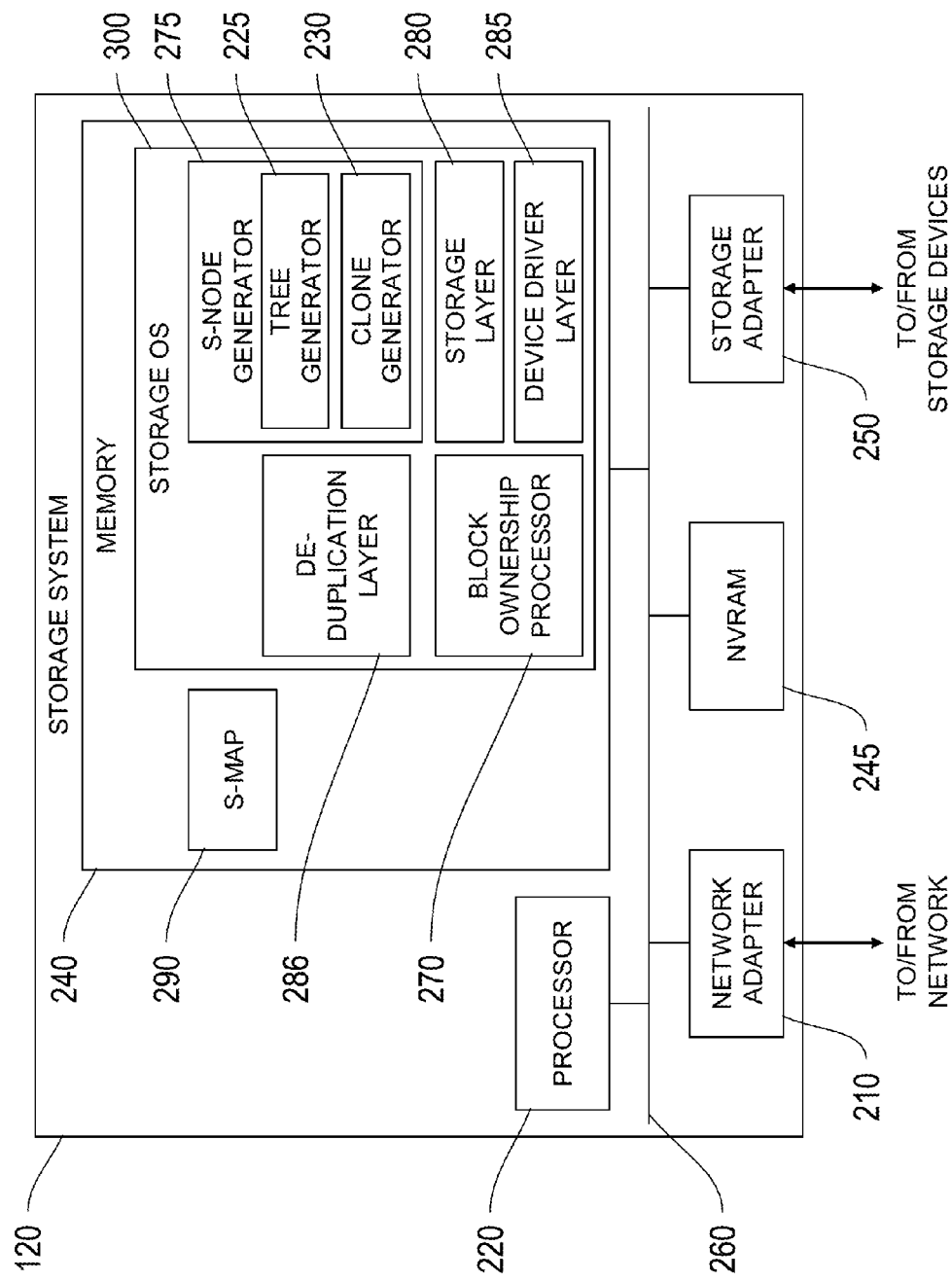
FIG. 2 is a schematic block diagram of a storage system, as described herein for use in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 includes a network adapter 210, a processor 220, a memory 240, a storage operating system 300 (henceforth storage OS 300), an S-node generator 275, a tree generator 225, a clone generator 230, a storage layer 280, a device driver layer 285, a de-duplication layer 286, a shared block map, henceforth S-map 290, a block ownership processor 270, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 135. The storage system 120 may include one or more network adapters. Each network adapter 210 has a unique IP address and may reference data access ports for server systems 110 to access the storage system 120 (where the network adapter 210 accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may be a non-volatile memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers, including an S-node generator 275, a storage layer 280 and a device driver layer 285, that are executed by the processor 220. The S-node generator 275 generates S-node data structure metadata to track file use of disk blocks in response to data storage operations which may include, among others, file creation, deletion, cloning, or deduplication. The S-node generator 275 contains a tree generator 225, and a clone generator 230, wherein both the tree generator 225 and the clone generator 230 may be computer processes executing on the data processing platform supporting the S-node generator 275. The tree generator 225 organizes S-node data structures into an updatable structure that links disk blocks to inodes, as described in greater detail with reference to FIGS. 6A and 6B. The clone generator 230 creates two new S-node data structures after a file cloning operation, as described in relation to FIGS. 8A-8D.

In some embodiments, the storage operating system 300 comprises a plurality of software layers, including a de-duplication engine/layer 286, a storage layer 280, and a device driver layer 285, that are executed by the processor 220. The deduplication engine/layer 286 processes data of a file during a "gathering" phase of deduplication, wherein deduplication removes redundant data from the storage system to ensure that only a single instance of the same data is stored on the storage devices. To this end, the deduplication method stores a single instance of the data that is referenced/indexed multiple times. Since redundant data is removed, deduplication of data typically saves storage space. Deduplication typically works by comparing a file to be written to the storage devices with the data blocks currently stored in the storage devices. Any matching blocks are deemed redundant blocks and are deduplicated (i.e., are deleted from or not stored to the storage devices, and a reference/index to the address location of the matching stored blocks is produced in their place). Any non-redundant blocks in the received file are written to the storage devices.

Deduplication may be performed by producing a content identifier value of each block that represents the data contents of the block. For example, the content identifier value of a block may be determined using a fingerprint, checksum, or hash operations (such as Message Digest 5, SHA, etc.) that produces a fingerprint, checksum, or hash value (content identifier value) representing the data contents of the block. Regardless of the particular content identifier operation used when two blocks have the same content identifier value, there is a high probability that the two blocks have the same data content as well, and thus one block may be deduplicated.

Typically, the content identifier of each block may be produced and stored to a content identifier database during the "gathering" phase. For example, during the gathering phase, each block of each file in a file system may be processed to populate the content identifier database. The content identifier database may then be used to identify redundant blocks and deduplicate blocks as necessary. The clone generator 230 may also create two new S-node data structures after a deduplication operation.

The storage layer 280 and device driver layer 285 process access requests, such as read and write requests, sent by the file system implemented by the storage system 120. The storage layer 280 can organize and administer the various access requests and the device driver layer 285 can direct the operation of the storage devices 125 to record and read data to and from the disk drive.

The software modules, software layers, or threads described herein may comprise firmware, software, hardware or any combination thereof and is configured to perform the processes described herein. For example, the storage operating system may comprise a storage operating system engine comprising firmware or software and hardware configured to perform embodiments described herein. As a further example, S-node generator 275 may have an engine which includes firmware or software and hardware configured to perform embodiments described herein. Portions of the storage operating system 300 are typically resident in memory 240 however various computer readable media, may be used for storing and executing program instructions pertaining to the storage operating system 300.

In some embodiments, an S-map 290 is also resident in memory 240. In other embodiments, the S-map 290 may also be resident in NVRAM 245 or stored on a storage device 125 (e.g., stored on an aggregate or volume in a metadata section not accessible to users). As discussed below, in some embodiments, the S-map 290 is produced and created by the S-node generator 275 to record the internal S-node data structure directly associated with a disk block.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

The storage devices 125 may comprise disk devices that are arranged into a plurality of volumes, each having an associated file system. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations, for example RAID-5 having distributed parity across stripes, RAID-DP, etc., are also contemplated. A single volume typically comprises a plurality of storage devices 125 and may be embodied as a plurality of RAID groups.

Figure 3:
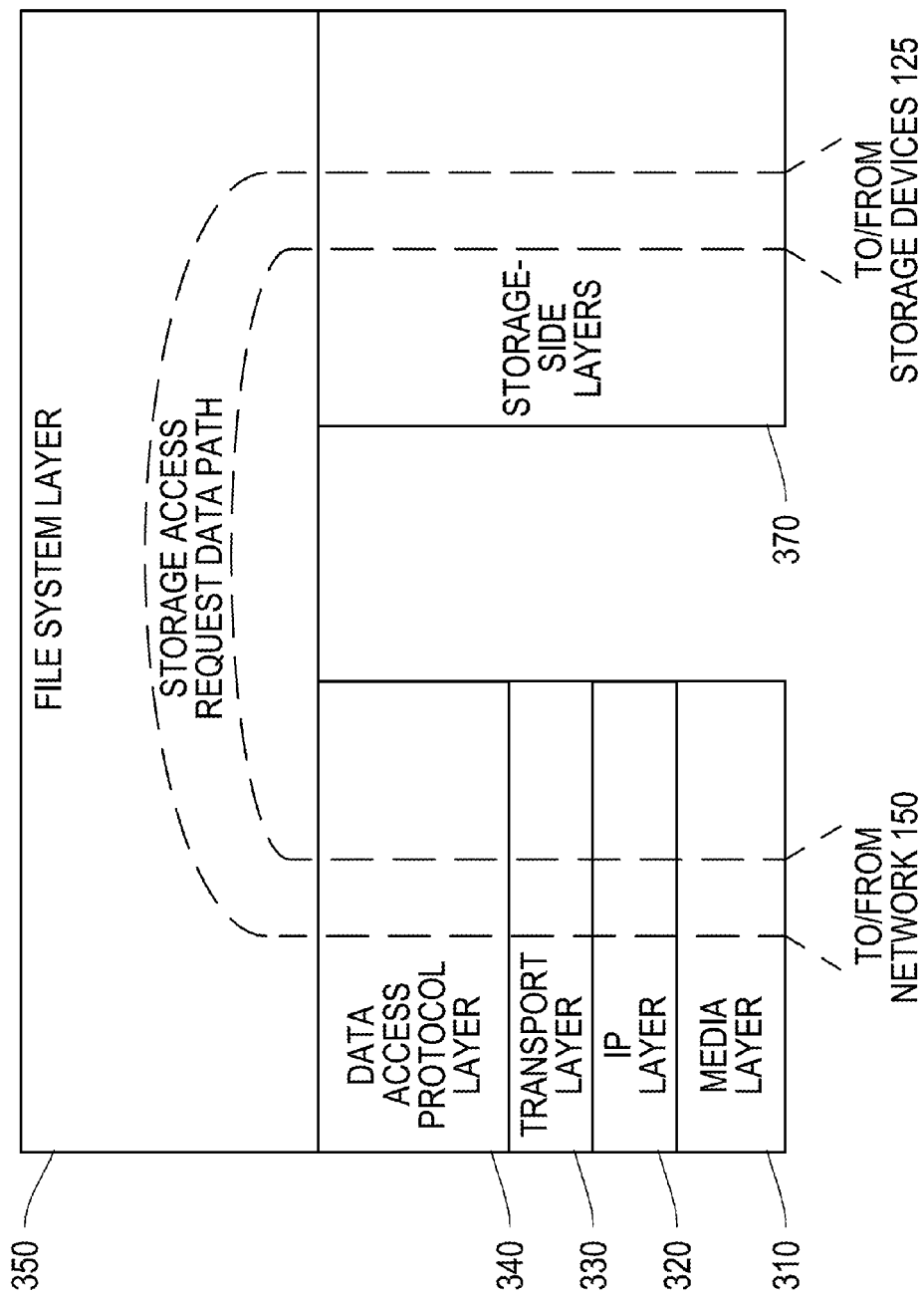
FIG. 3 shows a conceptual diagram of an exemplary file system.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330, for example TCP/UDP protocol. The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage layers, such as storage layer 280 depicted in FIG. 2. As shown in FIG. 3, the storage layer 280 may implement a storage protocol, such as a RAID protocol, and a device driver layer that implements a device control protocol, such as small computer system interface (SCSI), integrated drive electronics (IDE), etc. Bridging the storage layers 370 with the network and protocol layers is a file system layer 350 of the storage operating system 300.

In an illustrative embodiment, the file system layer 350 implements a file system having an on-disk format representation that is block-based using inode data structures to describe the files. The file system layer 350 assigns, for each file, a unique file identifier, an inode number, and an associated inode data structure. The file system 350 may store and maintain an inode file that contains and indexes by file identifier/inode number the inodes of the various files. In response to receiving a file-access request containing an external file handle from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode data structure entry for the identified file and retrieve file location information (e.g., logical block number) from the inode data structure.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system and storage operating system returns a response, e.g., a conventional acknowledgement packet defined by the CIFS specification, to the server system 110 over the network 135.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises an S-node generator 275 that operates in conjunction with the other software layers and the file system of the storage operating system 300. For example, the S-node generator 275 may reside between the file system layer 350 and the storage layer 370 of the storage operating system 300. In other embodiments, the S-node generator 275 may reside in or near other layers of the storage operating system 300 (e.g., may reside within the file system layer 350). In some embodiments, the S-node generator 275 may be pre-included in storage operating system 300 software. In other embodiments, the S-node generator 275 may comprise an auxiliary plug-in type software module that works with the storage operating system 300 to enhance its functions. As such, the S-node generator 275 may be applied to an existing storage operating system 300 and file system 350 to generate S-node data structures in response to data storage operations which may include, among others, file creation, deletion, cloning, or deduplication.

In some embodiments, the storage operating system 300 also comprises a block ownership processor 270. The block ownership processor 270 reports information on the number of shared and unshared blocks in a storage device 125, by comparing inode and S-node data structure disk block counts.

Figure 4:
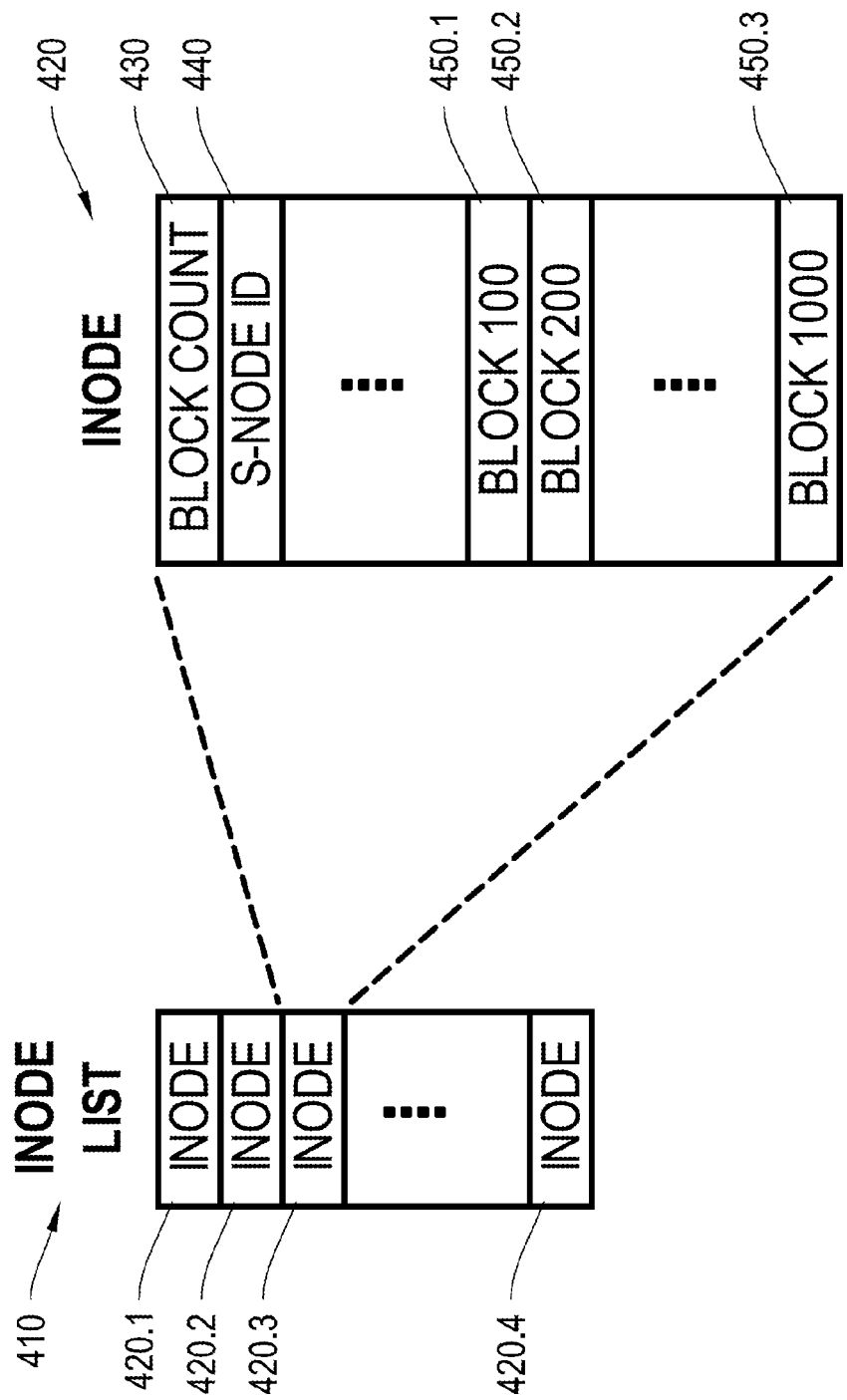
FIG. 4 is a conceptual diagram of an exemplary inode list and inode data structure associated with a file.

FIG. 4 is a conceptual diagram of an exemplary inode list 410 and inode data structure 420 representing a file. The depicted exemplary inode list 410 maintains a record, in memory, of all file system 350 inodes 420, whereby the list is indexed using the inode number of the inodes 420. The inode list 410 shown in FIG. 4 is populated by four inodes (420.1-420.4), which represent a larger list that may be used in a file system.

FIG. 4 also presents a conceptual diagram of an inode data structure 420 (buffer tree), wherein an inode data structure 420 is associated with a file. The inode data structure 420 may comprise an internal representation of data blocks for a file loaded into the memory and maintained by the file system 350. An inode data structure 420 for a file may store information about the respective file, such as the file type, access rights, the owner of the file, the size of the file, the last time it was accessed, any groups it belongs to and other information. The inode data structure 420 is made up of, among other things, disk block pointers 450, and three disk block pointers (450.1-450.3) are shown as representative of a larger list. The file disk block pointers 450 are separately numbered and, in the depicted embodiment, are sequentially numbered. The disk block pointers 450 point to the physical location of disk blocks on the primary storage, such as the storage devices 125, or optionally, to a logical storage location, using logical block addressing (LBA), which references the disk blocks using an integer index. As such, the inode data structure 420 provides the file system 350 with an abstraction of a data file that includes a series of disk block pointers 450 that point to the physical or logical location of the disk blocks that store the data that the disk block pointers 450 represent. In this embodiment, an inode data structure 420 also includes a block count 430, which records an integer number of blocks in-use by the file represented by the inode data structure 420. Additionally, the depicted inode data structure 420 includes an S-node identifier, or S-node ID 440 of the S-node data structure that points to the inode data structure 420, wherein this S-node ID is otherwise known as that of a "leaf" S-node data structure, further described in relation to FIG. 5.

Figure 5:
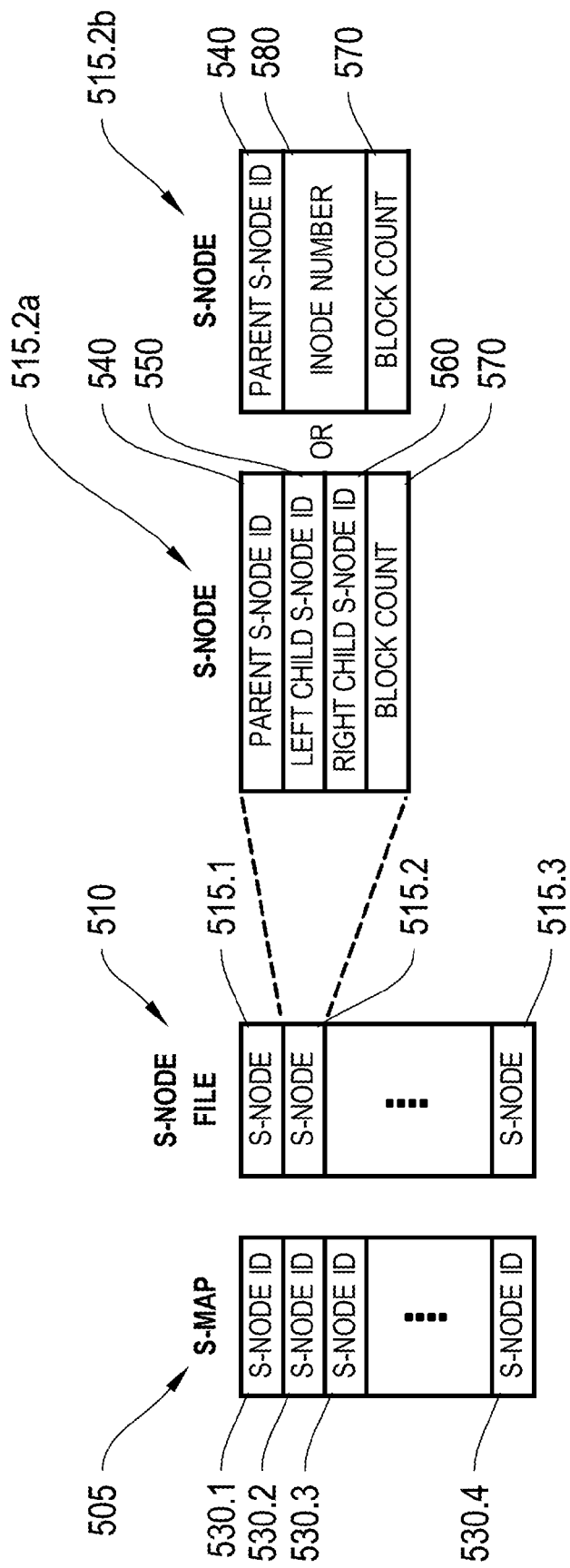
FIG. 5 is a conceptual diagram of exemplary S-node data structures.

FIG. 5 is a conceptual diagram of exemplary S-node data structures. Specifically, FIG. 5 depicts an S-map 505 storing a plurality of S-node ID's 530.1-530.4, collectively referred to as S-node ID's 530, an S-node file 510 storing a plurality of S-node data structures 515.1-515.3, collectively referred to as S-node data structures 515, and two alternative S-node data structures, 515.2a and 515.2b.

The S-node generator 275 is used to generate S-node data structures 515 in response to data storage operations which may include, among others, file creation, deletion, cloning, or deduplication. The S-node generator 275 resides in memory 240, and is instantiated when a disk block is allocated for use by the storage system 120, but does not have an associated S-node data structure 515 listed in the S-map 290. In response, the S-node generator 275 reserves a portion of free memory to establish a skeleton S-node data structure (515.2a or 515.2b), as described herein.

The S-map 505 is a table, stored in memory, wherein the memory may be persistent, which is to say it is non-volatile memory that does require a continuous energy input to retain information, such as those technologies used in magnetic-disk hard drives, Read Only Memory (ROM) chips, FLASH memory, optical disks, floppy disks, solid state drives (SSDs), and hybrid solid state-magnetic disk drives. The S-map 505 may optionally be stored in volatile memory, wherein volatile memory may comprise a form of random access memory (RAM) that is generally cleared by a power cycle or other reboot operation.

An S-map 505 has a placeholder for an S-node ID 530 for all disk blocks. The S-map 505 is indexed by disk block number, such that a S-node ID associated with a disk block can be found by looking up the entry in the S-map 505 corresponding to the disk block number of the disk block of interest. No S-node ID entry is stored in the S-map 505 for those disk blocks not used by any files in memory.

An S-node file 510 stores the data associated with all S-node data structures 515 in memory, and is indexed by S-node ID 530, such that the data stored within an S-node data structure 515 can be found by searching the S-node file 510 using the S-node ID 530.

Two alternative data structures of an exemplary S-node data structure 515.2 are shown, where S-node data structure 515.2a is an internal S-node data structure, and S-node data structure 515.2b is a leaf S-node data structure. The tree generator 225 organizes S-node data structures 515 into a binary structure such that an S-node data structure 515 is an internal S-node data structure, or it is a leaf S-node data structure. An internal S-node data structure 515.2a has data fields which include a parent S-node ID number 540, a left child S-node ID number 550, a right child S-node ID number 560 and a block count 570. A leaf S-node data structure 515.2b has data fields which include a parent S-node ID number 540, an inode number 580, and a block count 570, and an S-node data structure, whether an internal S-node data structure 515.2a or a leaf S-node data structure 515.2b, may be referenced by one or more disk blocks.

In one practice, S-node data structures 515, whether an internal S-node data structure, represented by S-node data structure 515.2a or a leaf S-node data structure, represented by S-node data structure 515.2b, maintain a record of the S-node data structure that is above them in the binary tree, otherwise known as the parent S-node data structure, wherein the reference is stored in a parent S-node ID number 540 field. For the internal S-node data structure 515.2a, the left child S-node ID number 550 identifies one of the two possible proceeding S-node data structures 515 in the binary tree that link disk blocks to inodes. Similarly, the right child S-node ID number 560 identifies the second of the two possible proceeding S-node data structures 515, and it is noted that either the left child S-node ID number 550 or the right child S-node ID number 560 may be null, but not both. In place of left child S-node ID number 550 or right child S-node ID number 560, a leaf S-node data structure 515.2b has the inode number 580 of the directly-connected inode that terminates the tree structure.

In another practice, S-node data structures 515, whether an internal S-node data structure 515.2a or a leaf S-node data structure 515.2b, record the number of disk blocks linked to S-node data structure by an S-map. This number is stored in the block count data field 570, and the number is incremented when a block is associated with an S-node data structure 515, and decremented when the association ends. Note that no S-node data structures 515 are associated with completely unused blocks. The block ownership processor 270 may be a computer process executing on the data processing platform supporting the Storage OS 300, and, upon receiving a request from the storage OS 300, the block ownership processor 270 can report the number of blocks uniquely in-use by a file. Referring to FIGS. 2, 4 and 5, the block ownership processor 270 can initiate the following steps to report the number of unshared blocks associated with a particular file. The inode data structure 420 associated with the file is found in inode list 410, and the inode data structure 420 contains the S-node ID 440 of that S-node data structure 515 directly attached to the file. The block ownership processor 270 uses the S-node ID 440 to find a respective S-node data structure 515 in the S-node file 510. The block count 570 of the S-node data structure 515 directly attached to the file inode data structure 420 represents the number of blocks uniquely in-use by the file (unshared with other files).

Figure 6A:
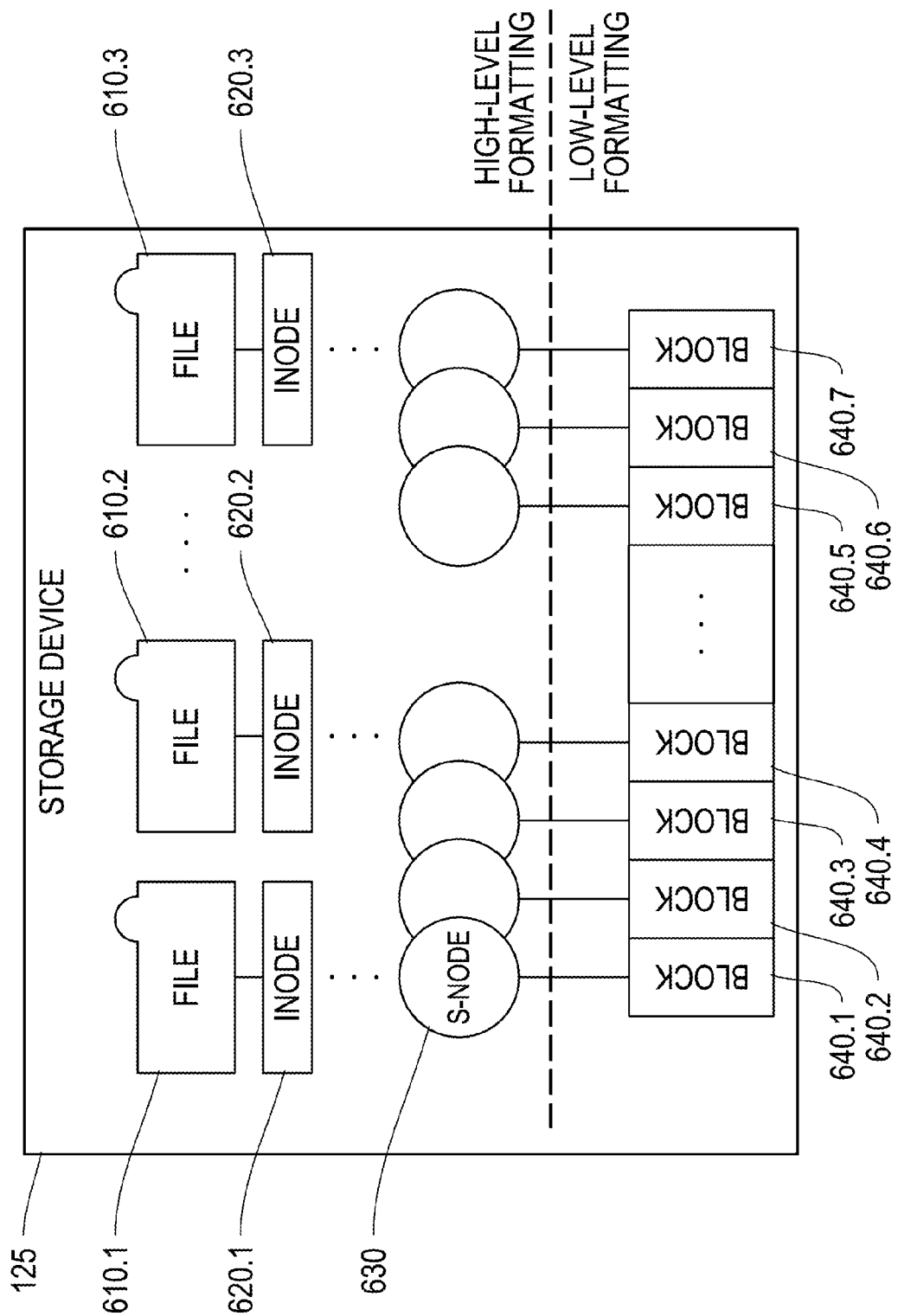
FIGS. 6A and 6B depict conceptual diagrams of a storage device that uses S-node data structures.
Figure 6B:
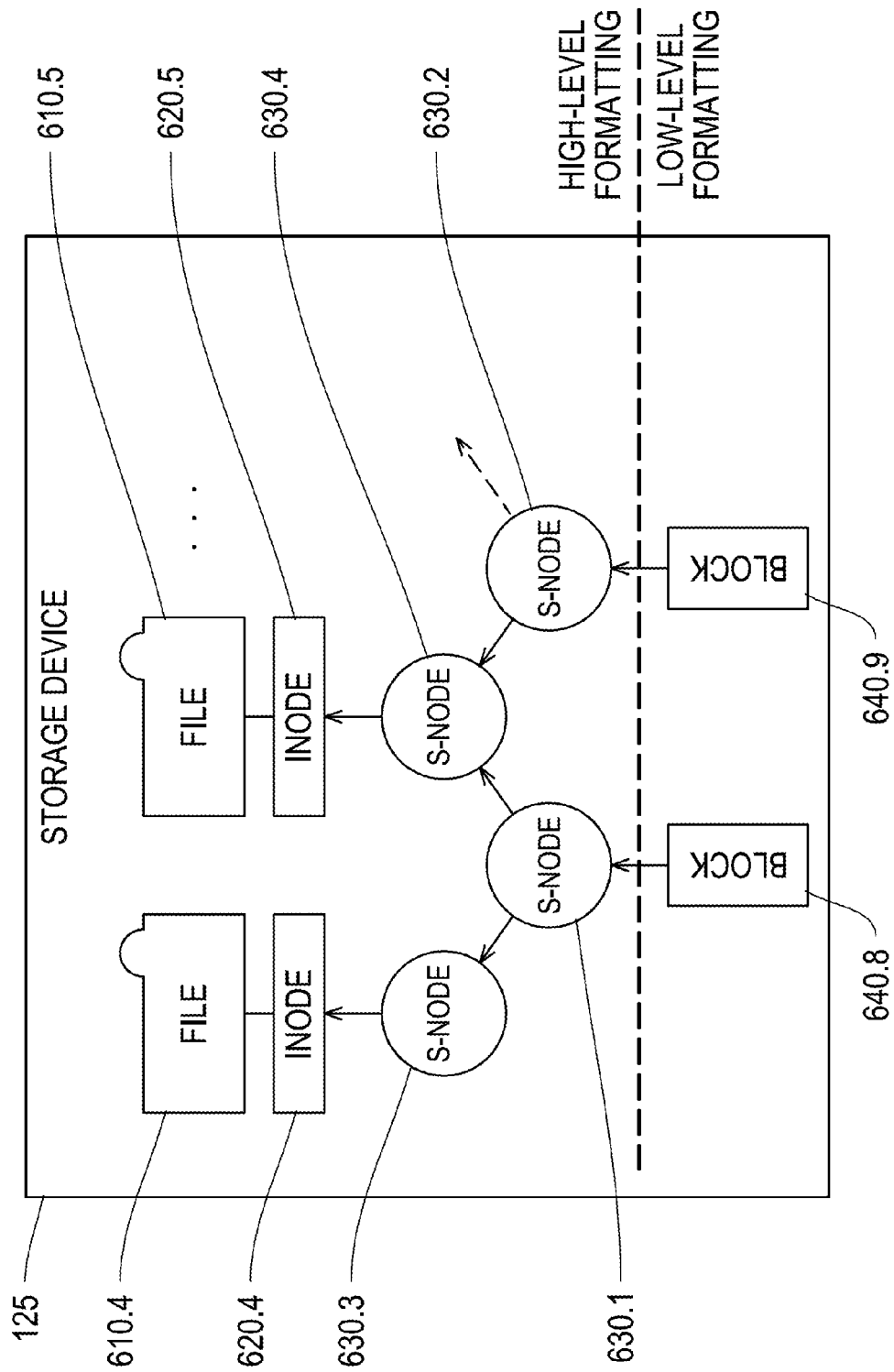

FIGS. 6A and 6B depict conceptual diagrams of a storage device 125 that uses S-node data structures. FIG. 6A depicts the storage device 125, conceptually divided between low-level physical formatting of the disk into disk blocks 640.1-640.7, collectively referred to as disk blocks 640, and high-level formatting of the storage device which creates files 610.1-610.3, collectively referred to as files 610, inodes 620.1-620.3, collectively referred to as inodes 620, and a plurality of S-node data structures 630.

Low-level formatting refers to the process of breaking up a physical storage space into a number of memory blocks of fixed-size. The physical storage space may be provided by a magnetic disk drive, commonly referred to as a hard drive, which operates using a spinning disk, or platter, onto which information is written using a moving read/write head, whereby information, in the form of bits, is stored by changing the magnetization of a thin ferromagnetic layer on top of the rotating disk using the movable head. This storage is non-volatile, since a continuous energy input is not required to retain the information. Low-level formatting breaks this physical ferromagnetic layer into sectors, and modern disks allow sectors to range in size from 1024 bytes (1 KB) to 8192 bytes (8 KB), with 4096 bytes (4 KB) commonly used, as outlined by the Advanced Format standard. Each sector of a magnetic disk is considered a disk block 640, and this formatting is typically permanent, with marks on the surface of the disk made to indicate the start and end of blocks, and completed as the disk drive is manufactured. Alternative non-volatile storage media include solid state hard drives, which employ arrays of semiconductor-based transistors to build memory blocks. Other non-volatile memory types include Read Only Memory (ROM) chips, FLASH memory, optical disks, floppy disks, solid state drives (SSDs), and hybrid solid state-magnetic disk drives, however magnetic-disk hard drives remain a popular choice for storing large amounts of information.

High-level, soft-formatting allocates a portion of the disk blocks 640 to store a file system on the storage device 125, wherein the file system is used to organize data files 610.1-610.3, which may represent a much larger number of files. The file system can be used to open, close, read and write files 610, and also for space management, such that the file system tracks the amount of allocable memory left on the storage device 125. To implement a file system, metadata is used to keep track of the primary data. In certain file systems, such as the Unix File System (UFS), inodes 620 may be used, where an inode 620 is associated with a file 610, and stores information about the disk blocks 640 are being used by the file 610, in addition to information about file 610 ownership, access mode, and type. S-node data structures 630 are also metadata which are implemented in a file system, and complement inode 620 metadata. Modes 620 provide information on the set of disk blocks 640 being used by a file 610, but they lack information on how many other files 610 are also using a particular disk block 640. An S-node data structure 630, in contrast, points from one or more shared or unshared disk blocks 640, to a set of inodes 620, thereby providing information about which disk blocks 640 are shared, and unshared, between files 610. This mapping between S-node data structures 630 and inodes 620 is shown in greater detail in FIG. 6B.

FIG. 6B depicts the storage device 125 of FIG. 6A, and additionally shows connections between internal S-node data structures 630.1 and 630.2, associated with disk blocks 640.8 and 640.9, and leaf S-node data structures 630.3 and 630.4. Leaf S-node data structure, 630.3 and 630.4, have a single associated inode, 620.4 and 620.5, and inodes have a single associated file, 610.4 and 610.5. The internal-leaf structure depicted in FIG. 6B provides a binary tree structure that allows an S-node data structure to either connect to an inode or to connect to one or two additional S-node data structures. In the embodiment shown in FIG. 6B, the S-node data structures form a binary tree having only two leaves, 630.3 and 630.4, however, the tree may include additional leaf S-node data structures, and those of skill in the art will recognize the tree structure will support the number S-node data structures needed to connect the blocks 640 with the inodes 620.

As further depicted in FIG. 6B, the set of inodes 620 that can be reached from an S-node data structure, whether an internal S-node data structure (630.1 or 630.2) or a leaf S-node data structure (630.3 or 630.4), is the set of all inodes 620 that can be reached by following the binary tree extending from that S-node data structure. When following the binary tree from an S-node data structure directly connected to a disk block, such as S-node data structure 630.1 directly connected to the disk block 640.8, those inodes 620.4 and 620.5, which are reachable from S-node data structure 630.1 indicate the files, 610.4 and 610.5, that are sharing the disk block 640.8, and this information on shared disk blocks can be used in the evaluation of disk space by the storage OS, such as storage OS 300.

II. Operational Examples

Figure 7A:
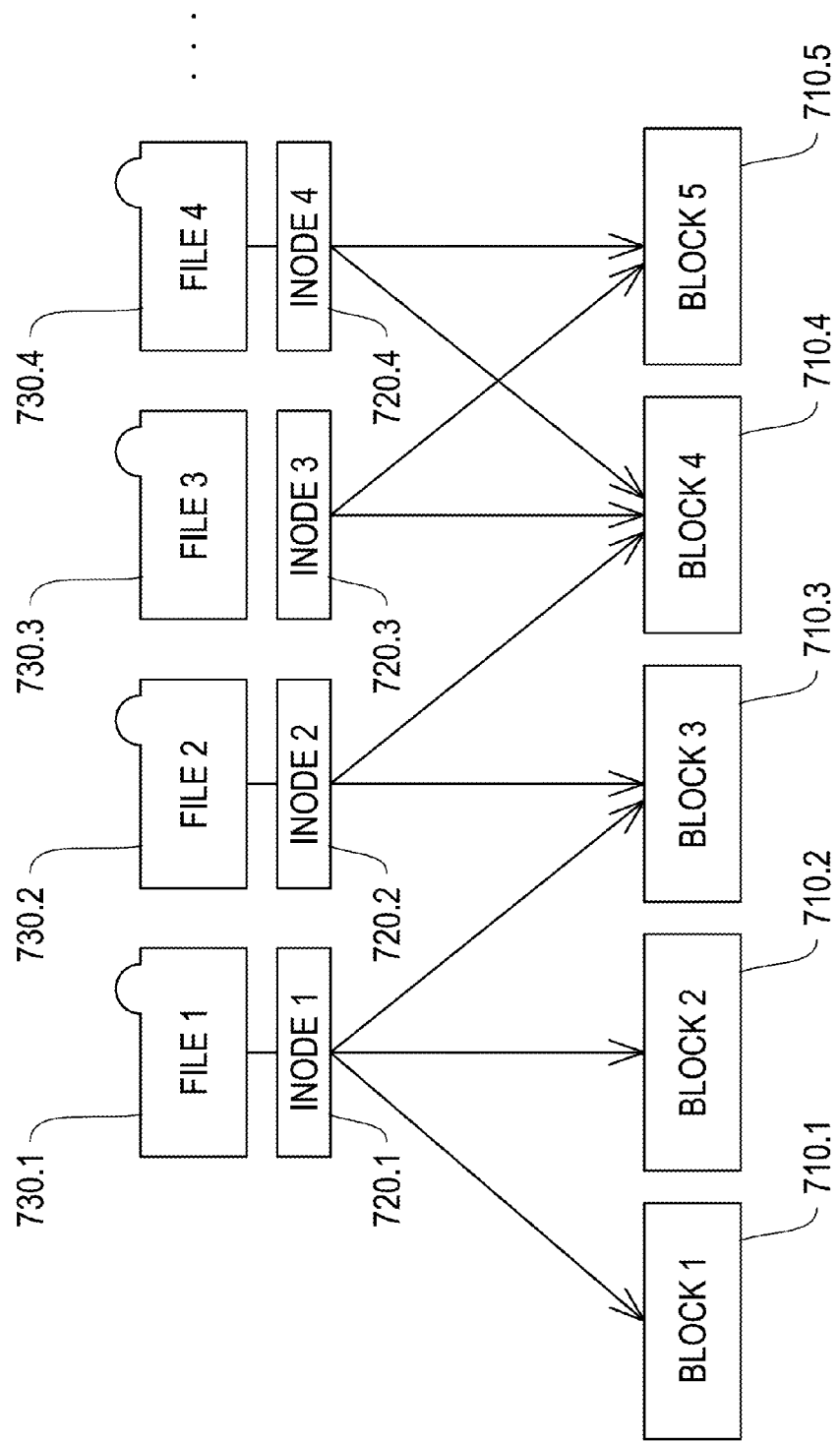
FIG. 7A conceptually depicts the relationship between files, their inodes, and the disk blocks owned by the files.

FIG. 7A conceptually depicts the relationship between files 730, their inodes 720, and the disk blocks 710 owned by the files 730. More particularly, FIG. 7 depicts four files 730.1-730.4, linked to five shared and unshared disk blocks, 710.1-710.5, by their respective four inodes 720.1-720.4, such that an inode 720 records the disk blocks 710 belonging to a file 730. but there is no feedback information as to which disk blocks 710 are shared and unshared.

Figure 7B:
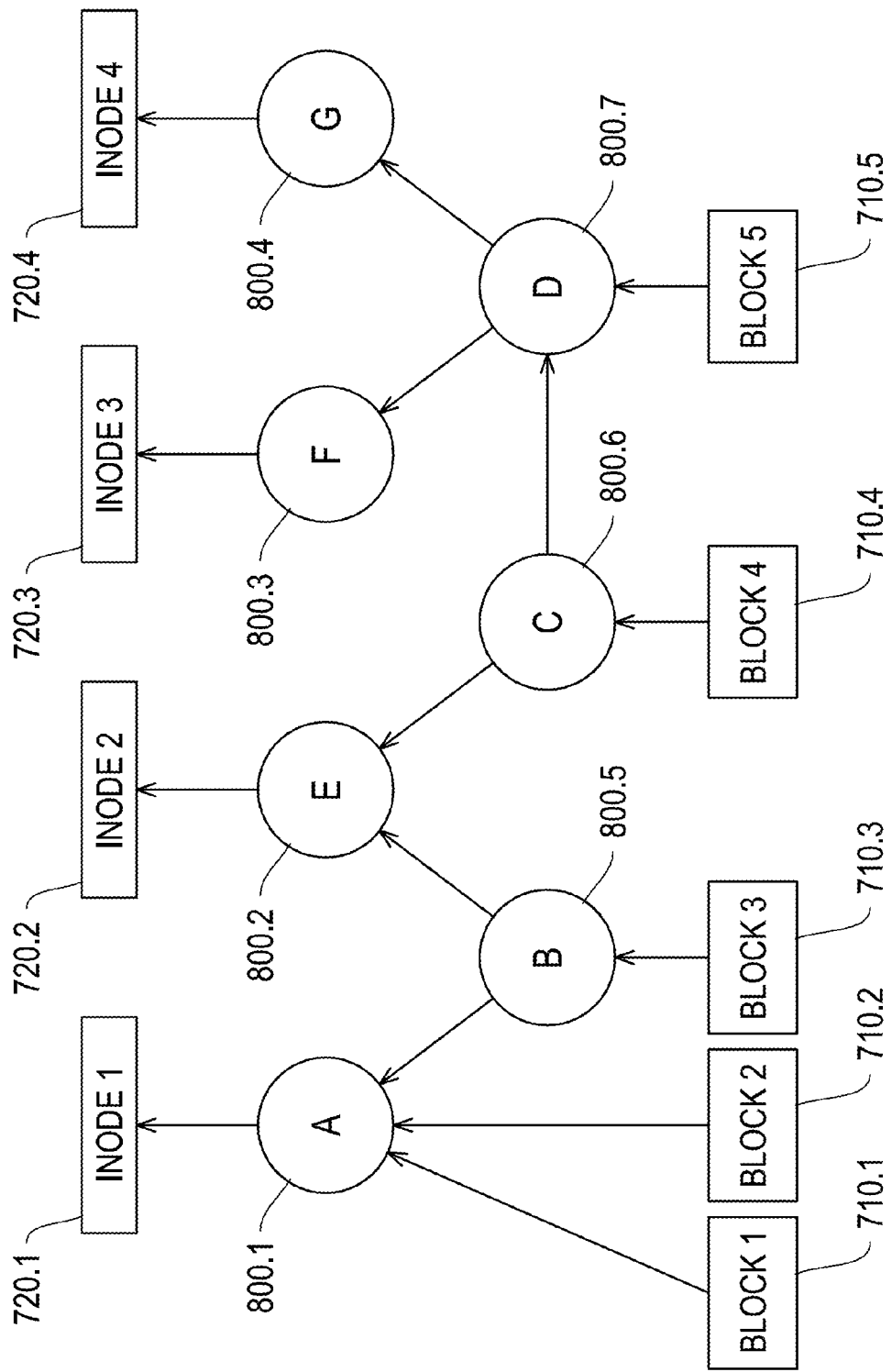
FIG. 7B depicts the S-node binary tree which links the disk blocks and inodes shown in FIG. 7A.

FIG. 7B depicts seven distinct leaf and internal S-node data structures 800.1-800.7 associated with the five disk blocks 710.1-710.5 and four inodes 720.1-720.4 shown in FIG. 7A. FIG. 7A depicts files 730 pointing to blocks 710 without the use of feedback to convey information about block sharing, but FIG. 7B introduces a feedback mechanism with S-node data structures 800. Internal S-node data structures (800.5, 800.6, 800.7) form a binary tree originating at disk blocks 710, with the binary tree terminating in leaf S-node data structures (800.1, 800.2, 800.3, 800.4), wherein a leaf S-node data structure 800 has a pointer to an inode 720. Note that disk blocks 710.1 and 710.2 have a common leaf S-node data structure 800.1 since they are unshared with another file. In contrast, block 710.3 is shared with more than one file, specifically those two files associated with inodes 720.1 and 720.2. Disk block 710.4 is shared between three files, those associated with inodes 720.2, 720.3, and 720.4, and internal S-node data structure 800.6 links to both leaf S-node data structure 800.2, and another internal S-node data structure 800.7 to accommodate this. Disk block 710.5 is shared by those files associated with inodes 720.3 and 720.4, and the associated tree structure is similar to that for disk block 710.3 as a result.

Figure 8A:
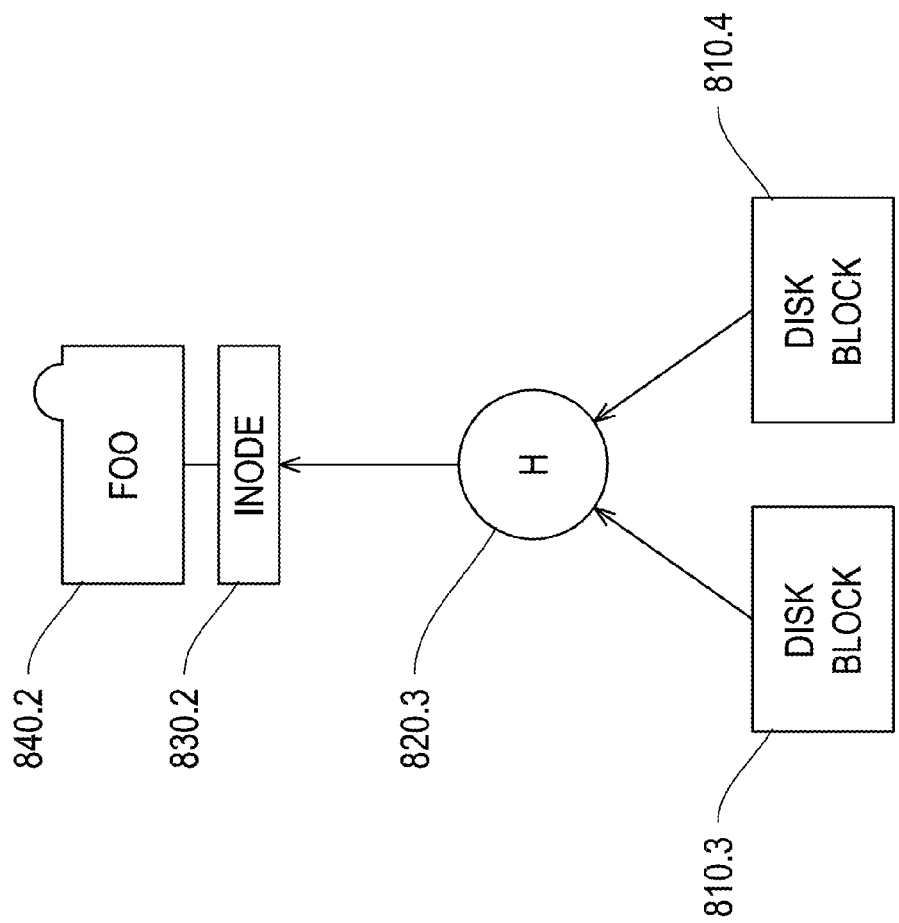

FIGS. 8A-8E depict the behavior of S-node data structures in file cloning operations. More particularly, FIG. 8A depicts the relationship between a file foo 840.2, the file's inode 830.2, and two disk blocks 810.3, and 810.4, which are both used by foo 840.2, and not shared with any other files. Foo owns blocks 810.3, and 810.4 exclusively, hence both blocks 810.3, and 810.4 are associated with the same leaf S-node data structure 820.3.

FIG. 8B depicts the cloning operation of foo' 840.2 to files foo 840.3 and bar 840.4, wherein foo' is the version of foo at the time of cloning. Cloning operations are typically used in storage systems to allow users to modify new versions of files, while retaining the information held within older versions. A file clone is, in one embodiment, an exact copy of a file original, and until a file clone diverges, or is changed/edited in some way from its original form, both files can share the same physical disk blocks on a storage device, and therefore not use much more real storage space than before the cloning operation (there will be additional metadata created to track the new clone). If, for example, a large video file of 1 GB in size is cloned, and 100 MB of additional editing is added to the new clone, the resulting real disk space required to accommodate the two files would be only around 1.1 GB (the sum of the original 1 GB file and the 100 MB of additions). In this way, cloning allows for more efficient storage of information given a limit to physical storage space.

In particular, FIG. 8B depicts file foo 840.3 which has an inode 830.3, and file bar 840.4, which has an inode 830.4, disk blocks 810.3 and 810.4, S-node_H 820.3, S-node_J 820.1, and S-node_K 820.2. Upon cloning of foo' 840.2 to files foo 840.3 and bar 840.4, two new S-node data structures are created (S-node_J 820.1, and S-node_K 820.2) by the clone generator 230. Until files foo 840.3 and bar 840.4 diverge, the disk blocks 810.3 and 810.4 remain owned by S-node_H 820.3.

Figure 8C:
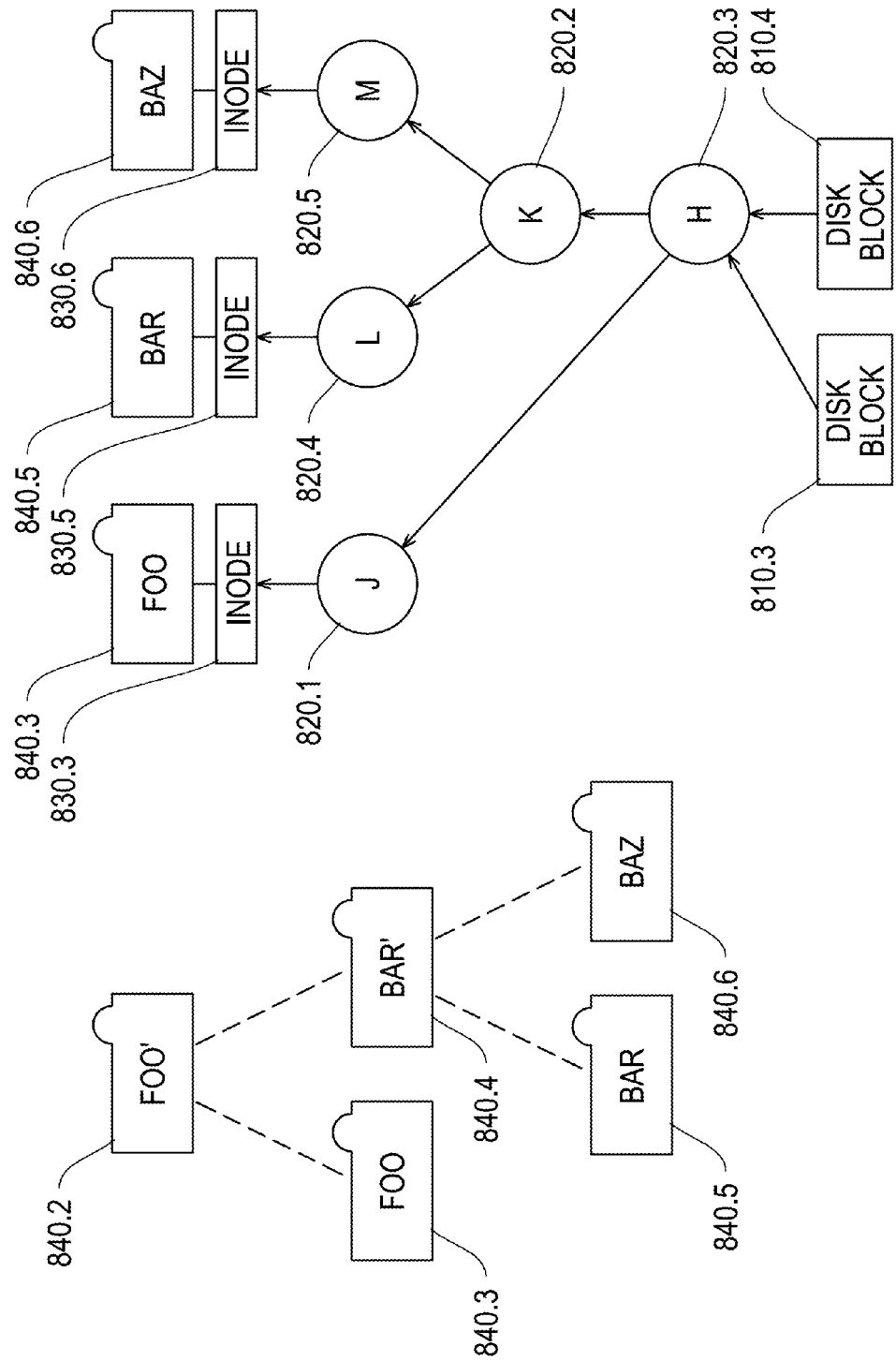

FIG. 8C depicts the cloning of file bar' 840.4 to files bar 840.5 and baz 840.6, wherein bar' is the version of bar at the time of cloning. In particular, FIG. 8C depicts files foo 840.3, bar 840.5, and baz 840.6, corresponding inodes 830.3, 830.5, 830.6, disk blocks 810.3, 810.4, S-node_H 820.3, S-node_J 820.1, S-node_K 820.2, S-node_L 820.4, and S-node_M 820.5. Upon cloning file bar' 840.4 to files bar 840.5 and baz 840.6, two new S-node data structures 820 are created (S-node_L 820.4, and S-node_M 820.5) by the clone generator 230. Again, until file divergence, there is no change in block internal S-node_H 820.3.

Figure 8D:
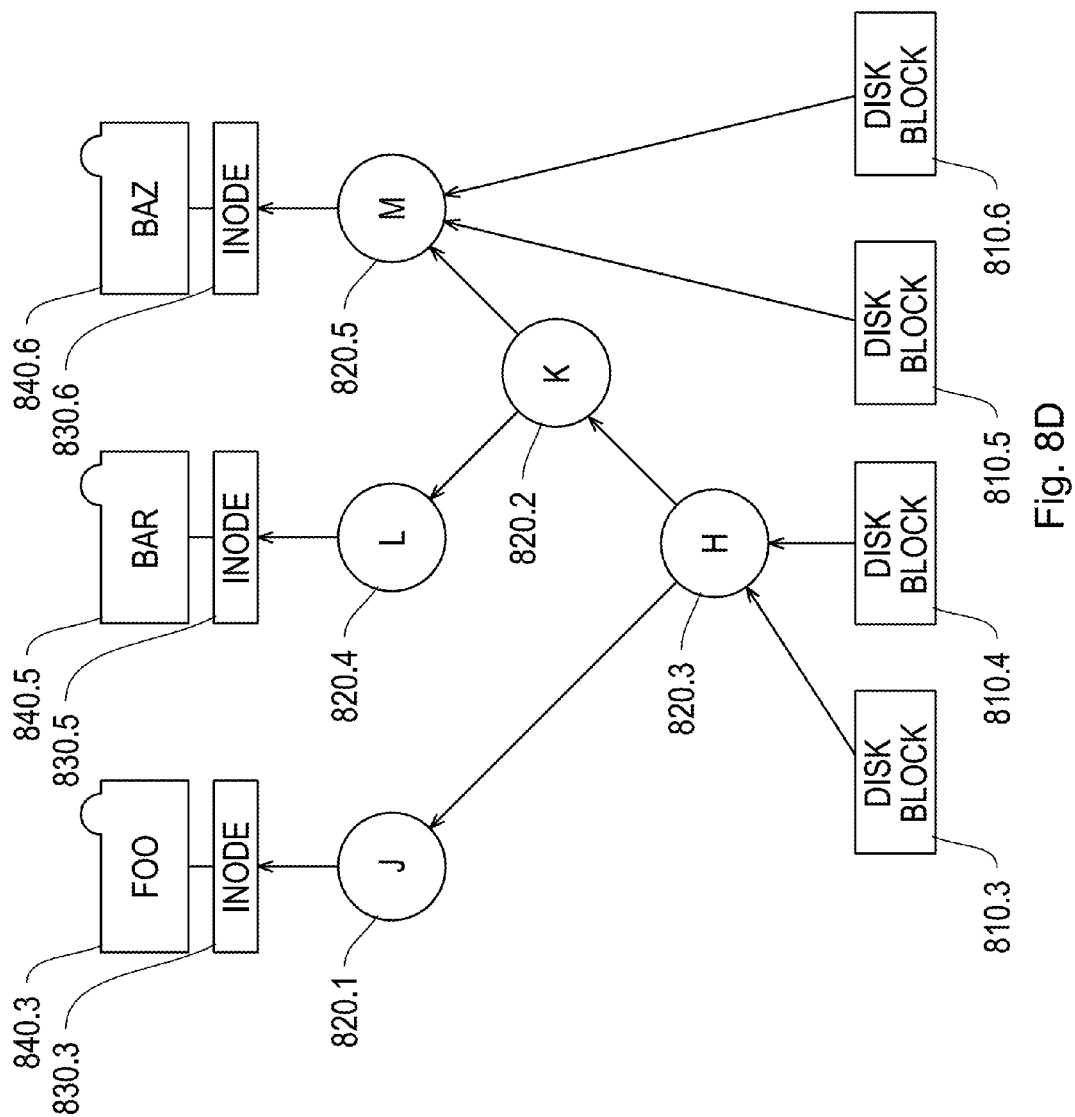

FIG. 8D depicts a file baz 840.6 diverging. In particular, FIG. 8D depicts files foo 840.3, bar 840.5, and baz 840.6, corresponding inodes 830.3, 830.5, 830.6, disk blocks 810.3, 810.4, S-node_H 820.3, S-node_J 820.1, S-node_K 820.2, S-node_L 820.4, and S-node_M 820.5. File baz 840.6 diverges as it expands to require more disk space, with the extra space provided by disk blocks 810.5 and 810.6. These disk blocks 810.5 and 810.6 are assigned leaf S-node_M 820.5, since they are both unshared with any other file 840.

Figure 9A:
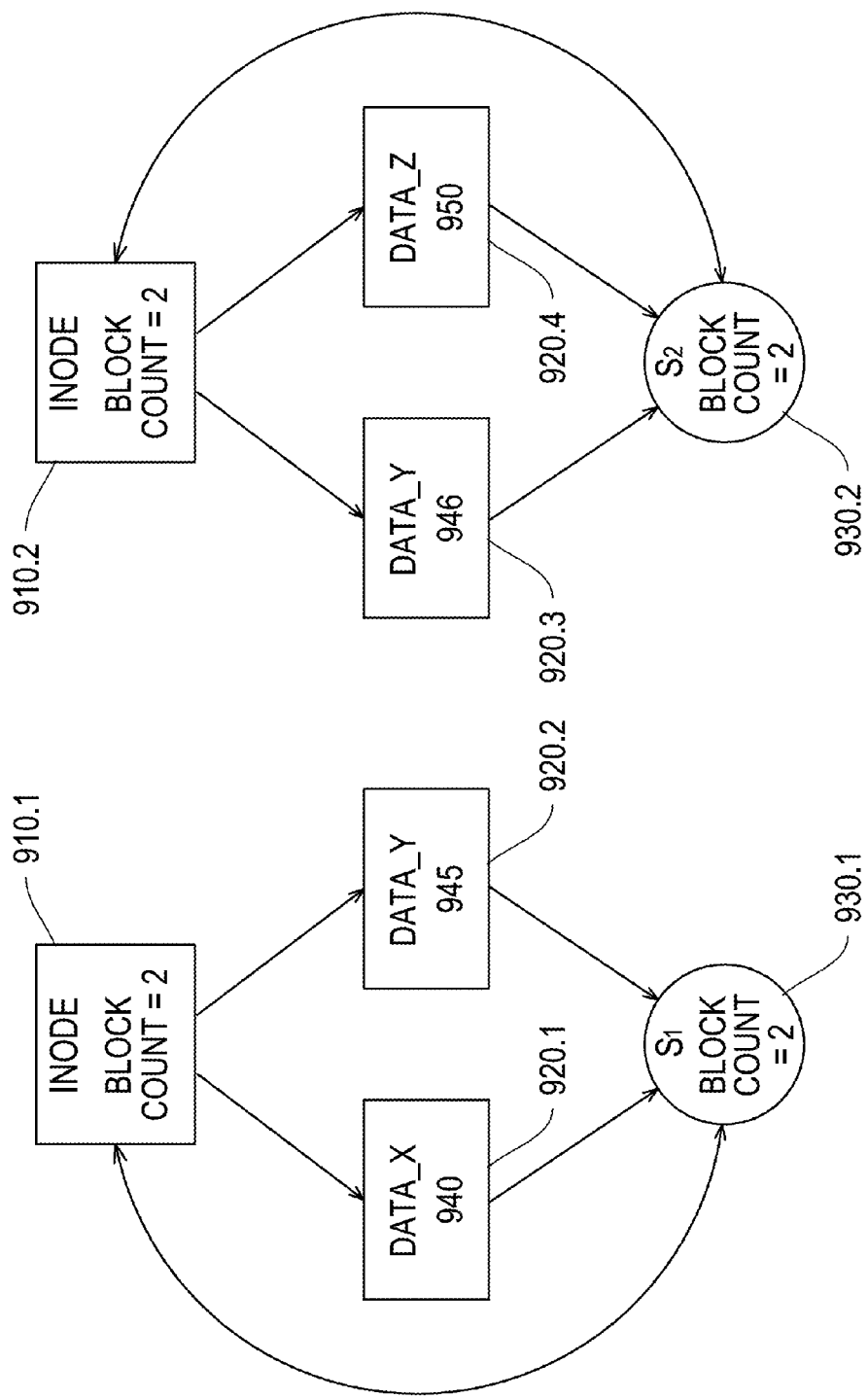
FIGS. 9A-9B depict a deduplication operation using S-node data structures.
Figure 9B:
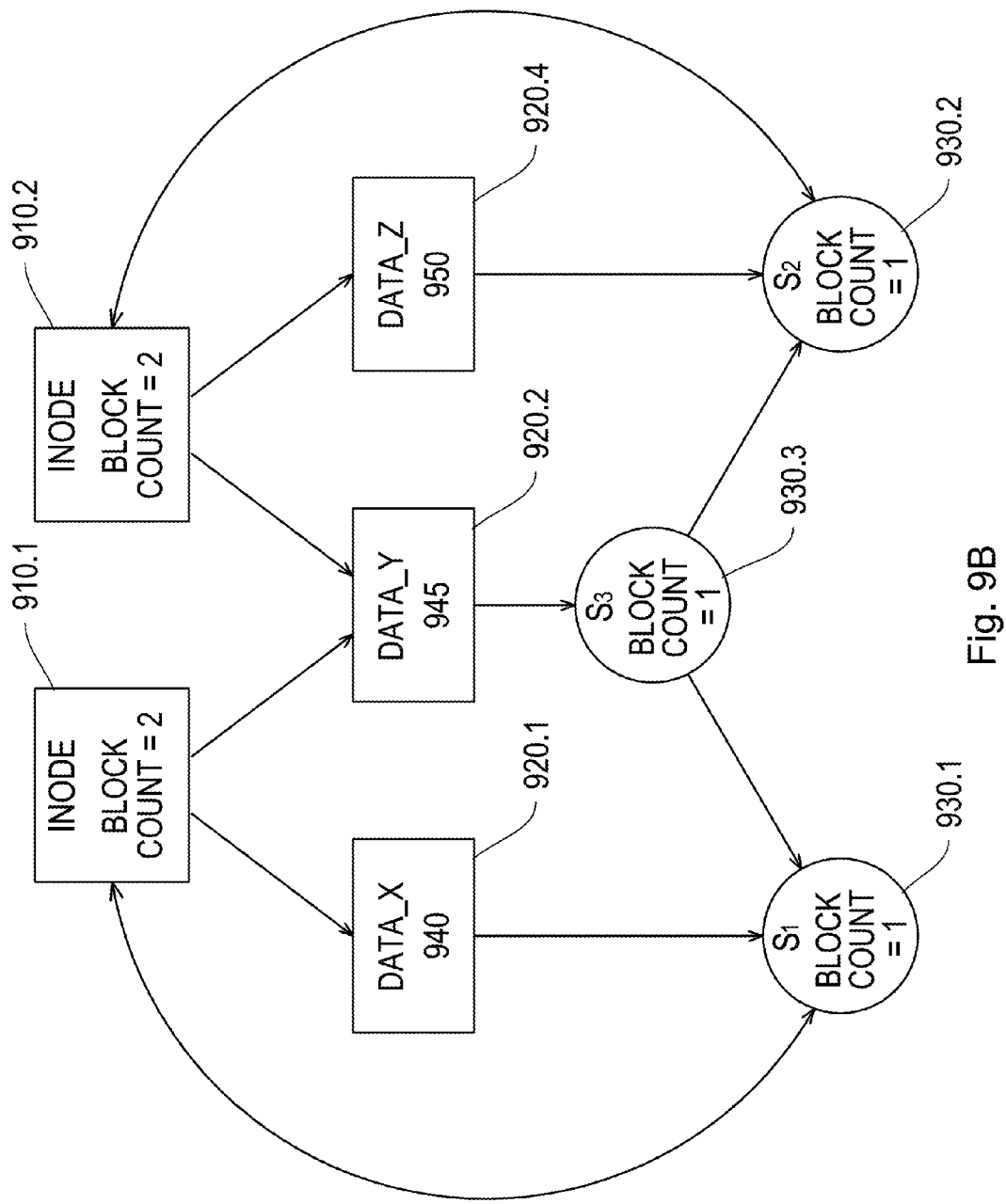

FIGS. 9A-9B depict a deduplication operation using S-node data structures 930. FIG. 9A depicts two inodes 910.1 and 910.2, four disk blocks 920.1-920.4, four data blocks 940, 945, 946, 950, and two S-node data structures 930.1, 930.2. Deduplication is the process by which repeated, or duplicated, data in a file system is deleted, to save storage space. FIG. 9A contains duplicate data, data_Y 945 and 946 in blocks 920.2 and 920.3 respectively.

During deduplication, a processor iterates through the data, looking for duplicate data that matches reference data. In FIG. 9A, 920.2 is defined as a reference data block and 920.3 as a duplicate data block. A new S-node data structure is assigned to the reference block 920.2. This new S-node data structure may already be in-use, or may be allocated during the deduplication process, whereby the newly allocated S-node data structure has a left child S-node ID set equal to the S-node ID of the S-node data structure directly associated with the reference block, which is S-node data structure 930.1, and a right child S-node ID set equal to the S-node ID of the S-node data structure directly associated with the duplicate block 920.3, which is S-node data structure 930.2. The new S-node data structure assigned to the reference blocks 920.2 may also be reused, where a reusable S-node data structure must have the same set of leaf S-node data structures as the combined total of the reference block's set of leaf S-node data structures and the leaf S-node data structure associated with the duplicate block's inode. For example, if a reference block has a directly associated internal S-node data structure that is able to reach leaf S-node data structures {A, B, C} and the duplicate block's inode has a leaf S-node data structure D, the new owner S-node data structure for the deduplicated data may be any S-node data structure which can reach only those S-node data structures {A, B, C, D}.

Deduplication further involves allocation of a new S-node data structure to the duplicate data block. If the duplicate block is not shared, i.e. its internal S-node data structure is also a leaf S-node data structure, then there is no new S-node data structure allocation, and the S-map entry for the duplicate block will be set to null. If the duplicate block is shared, then the new internal S-node data structure must be able to reach, through the S-node tree structure, the set of leaves currently reachable from the S-node data structure currently associated with the duplicate block, but without one instance of the leaf S-node data structure associated with the duplicate block's inode. For example, if the inode associated with the duplicate block has leaf S-node data structure E, and the duplicate block is able to reach leaf S-node data structures {E, E, F}, the new internal S-node data structure, directly associated with the duplicate block, must be able to reach leaves {E, F}. For the example case shown in FIG. 9A, the duplicate block 920.3 is not shared, so no new S-node data structure is allocated.

FIG. 9B depicts the continued deduplication process from FIG. 9A. A new internal S-node data structure 930.3, directly associated with the reference block 920.2 is shown. The S-map entry for the reference block 920.2 is updated to the new directly associated S-node data structure 930.3. As with all S-map changes, the block count of the reference block's (920.2) previous S-node data structure 930.1 is decremented, and the block count of the reference block's (920.2) new S-node data structure 930.3 is incremented. Note that for all S-node data structure block count decrements, if the S-node data structure has a block count of zero, and no associated inode, the S-node data structure is removed. The block pointer in inode 910.2 is changed to point to the reference block 920.2. The final deduplication step is to release the duplicate block 920.3 for use by other files, whereby this release includes the removal of an entry in the S-map, such as the S-map 505 described in FIG. 5, for this duplicate block 920.3.

FIG. 9 also illustrates the use of block counts by S-node data structures 930, and inodes 910, which record the number of disk blocks 920 directly associated with an S-node data structure 930, and pointed to by an inode 910, respectively. These block counts may be used to quickly identify the amount of physical disk space that may be recovered upon deletion of a file. If, for example, the file associated with inode 910.1 from FIG. 9B is targeted for deletion, then the block ownership processor 270 may be used to poll inode 910.1 for the S-node ID, stored in the inode data structure, of the leaf S-node data structure, that of S-node data structure 930.1, associated with the file. The block count stored in a leaf S-node data structure, such as S-node data structure 930.1, represents the amount of physical storage space that can be recovered upon deletion of the file. In this instance, S-node data structure 930.1 has a block count of 1, and one disk block, 920.1, will be recovered upon deletion of the file associated with the leaf S-node data structure 930.1 (the file having inode 910.1).

Figure 10A:
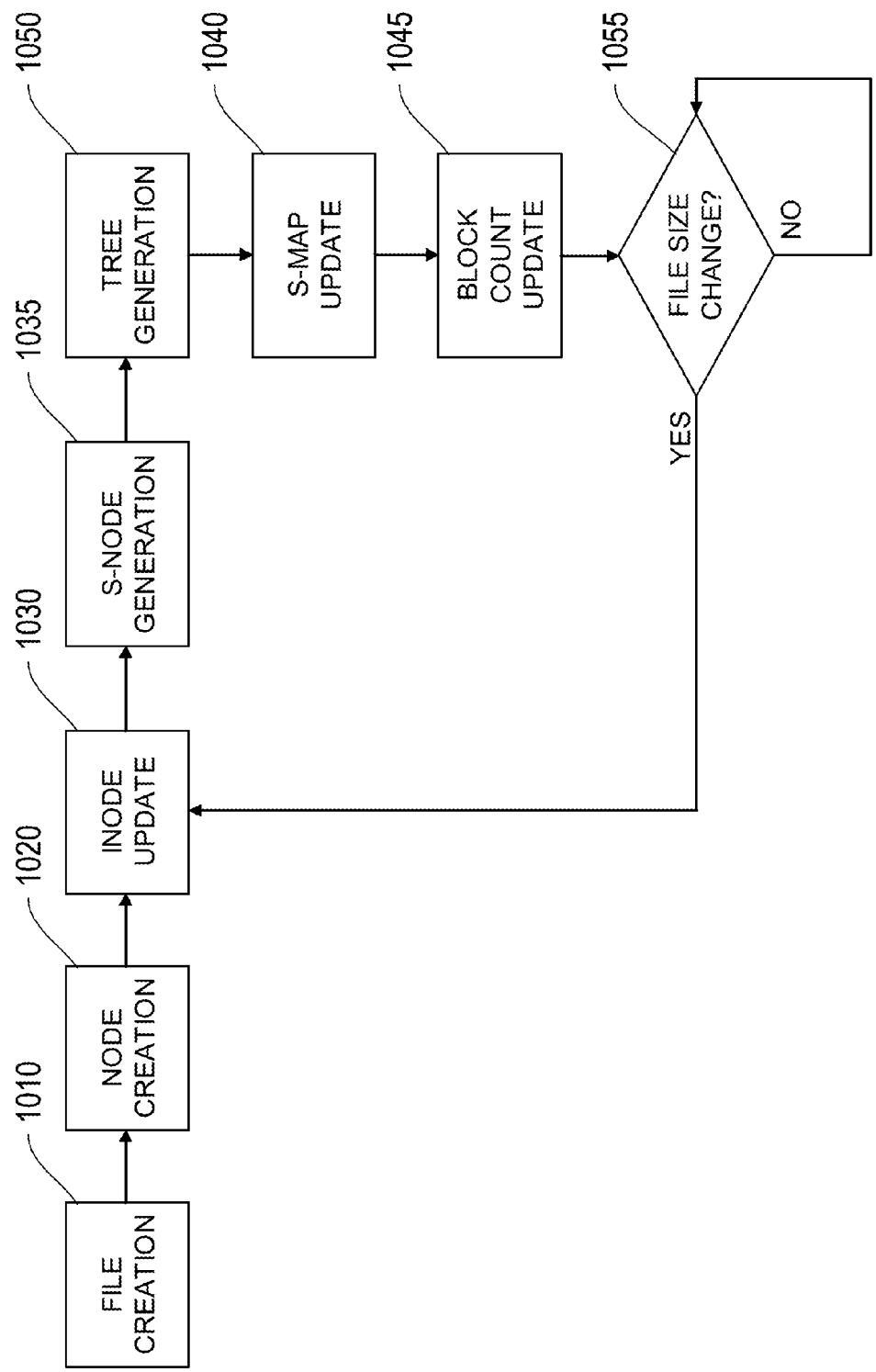
FIGS. 10A-10C are flowcharts of methods for using S-node data structures.
Figure 10B:
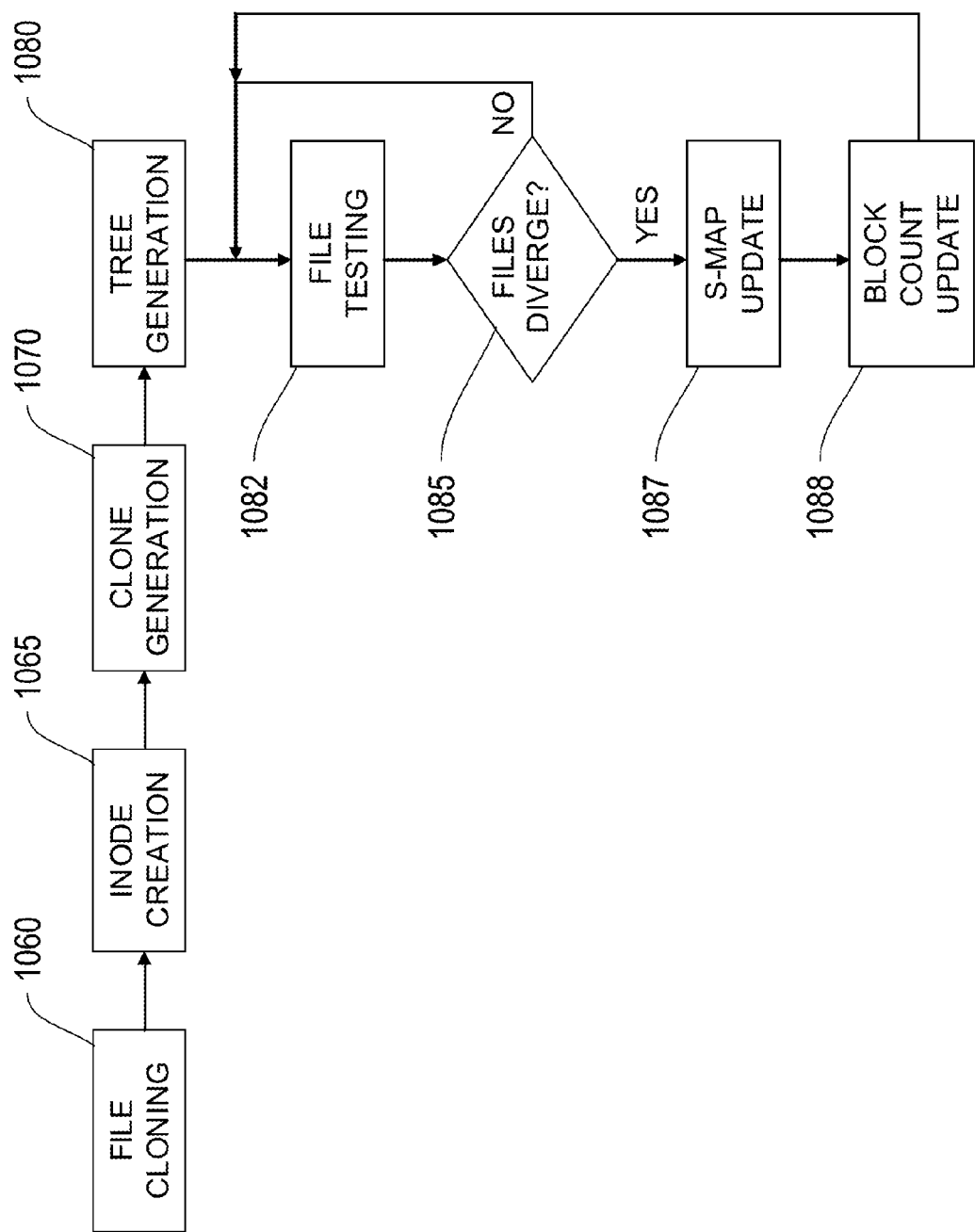
Figure 10C:
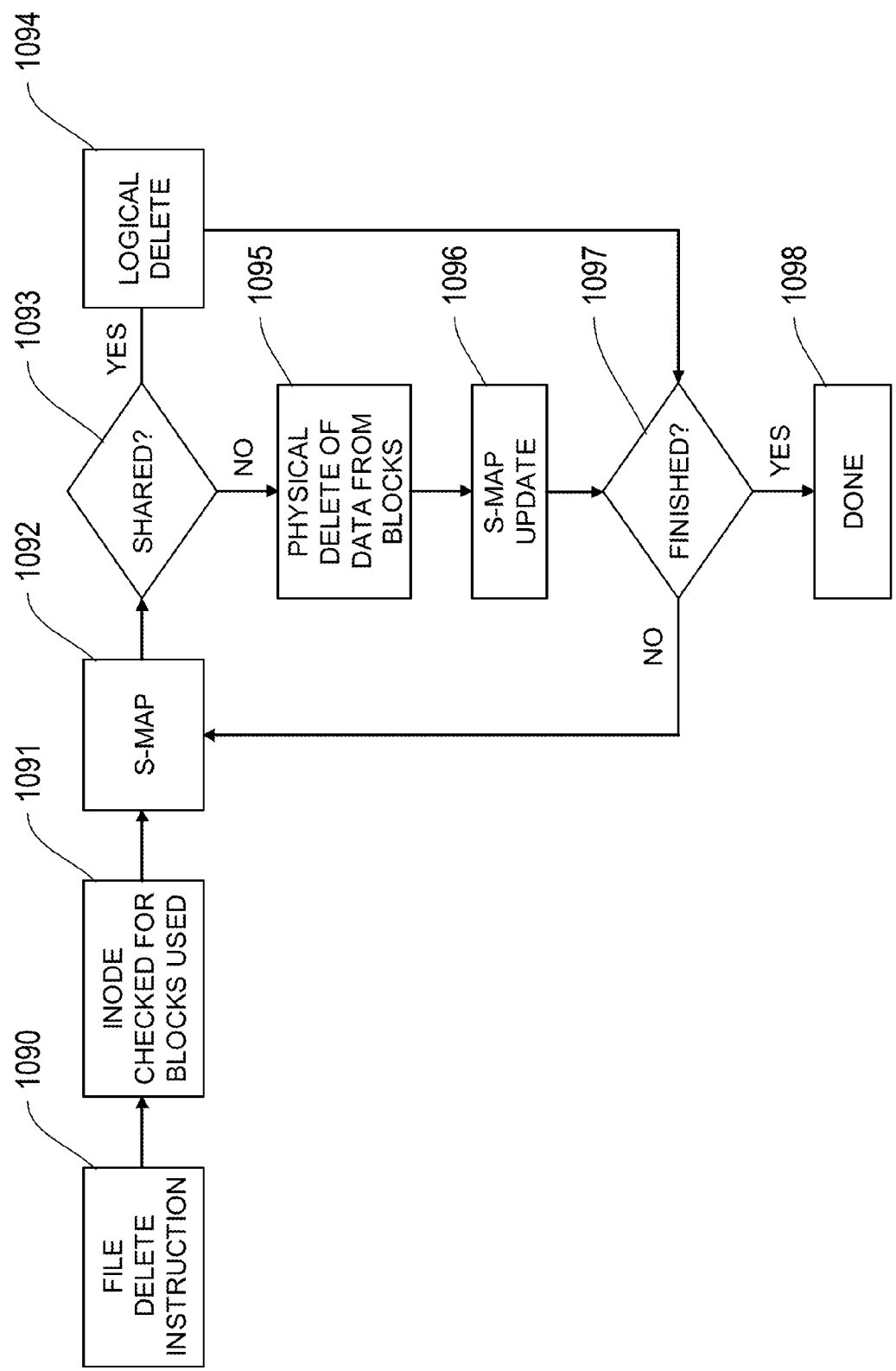

FIG. 10A-10C are flowcharts of methods for using S-node data structures. In particular, FIG. 10A depicts the steps following the creation of a file. File creation step 1010 represents the allocation of memory in the file system for a new file by the storage operating system. Metadata to keep track of the file is created at inode creation step 1020. As the file is used to store information, the file system updates the file inode to reflect the list of disk blocks in-use by the file. This is carried out at inode update step 1030.

In response to the file creation, or to changing the number of disk blocks being used by a file, the S-node generator is used to create S-node data structures, as shown by the S-node data structure generation step 1035. Subsequently, the tree generation step 1050 is used to re-organize the S-node data structures in response to S-node data structure generation. The S-map update step 1040 records the S-node data structures associated with in-use disk blocks, and the block count update step 1045 increments or decrements the count of blocks directly associated with S-node data structures accordingly. Decision point 1055 represents a holding position until such time that the file content changes, in which case the flow feeds back to the inode update 1030 step.

FIG. 10B depicts a flowchart of a file cloning operation. Initially, file cloning step 1060 results in a new file, and a new inode is created for the newly cloned file, as per inode creation step 1065. The clone generator within the S-node generator is used to create two new S-node data structures associated with the cloned file at step 1070, and the tree generation step 1080 is used to re-organize the S-node data structures in response to the creation of the two new S-node data structures. The original and cloned files are tested for divergence at step 1082, and decision point 1085 allows updates to the S-map to be postponed until the cloned files diverge. Upon divergence, the S-map is updated at step 1087. The block count of the S-node data structures is updated at step 1088. A feedback loop to file testing step 1082 illustrates that steps 1087 and 1088 repeat upon further divergence of the disk blocks.

FIG. 10C is a depiction of a file deletion operation. Upon initiating a file delete instruction 1090, the storage operating system 300 polls the associated file inode for the list of disk blocks in-use by the file (step 1091). Having identified the blocks used by the file to be deleted, the S-map is consulted, and the S-node data structures associated with the in-use disk blocks found (S-map step 1092). At decision point 1093; if the disk block of interest is shared with another file, as reported by the S-node data structure directly associated with the disk block, then a logical delete 1044 is performed, which removes reference to the file in the internal S-node data structure. If the block of interest is unshared with another file, a physical delete of the data form the block can be carried out. An S-map update 1096 is performed after the block deletion. Decision point 1097 asks whether all blocks in the file to be deleted have been iterated through. If the answer is no, the flow feeds back to the S-map step 1092.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage management computing device comprising:
 a processor;
 a memory coupled to the processor and configured to be capable of executing programmed instructions comprising and stored in the memory to:
  associate file node data structures with at least one file in a file system, the file node data structures comprising information on respective disk blocks in use by the at least one file;
  generate a sharing node data structure in the file system, the sharing node data structure directly associated with the respective disk blocks and the file node data structures, and comprising information on a relationship between the file node data structures and the associated respective disk blocks;
  detect an allocation in the file system of at least one of the respective disk blocks associated with the file node data structures; and
  map the respective disk blocks to the file node data structures associated with the respective disk blocks by using the sharing node data structure when the allocation is detected.

2. The storage management computing device of claim 1, wherein the processor is further configured to be capable of executing programmed instructions comprising and stored in the memory to:
 generate internal sharing node data structures pointed to by the respective disk blocks;
 generate leaf sharing node data structures comprising pointers for pointing to the file node data structures; and
 connect the internal sharing node data structures and the leaf sharing node data structures into a tree linking the respective disk blocks with the file node data structures.

3. The storage management computing device of claim 1, wherein the processor is further configured to be capable of executing one or more programmed instructions comprising and stored in the memory to:

detect a cloning operation carried out on the file node data structures; and generate two sharing node data structures when the cloning operation is detected, wherein the two generated sharing node data structures comprise the same parent sharing node data structure or the same respective disk blocks.

4. The storage management computing device of claim 1, wherein the processor is further configured to be capable of executing one or more programmed instructions comprising and stored in the memory to:

generate a shared block map comprising information representative of the respective disk blocks and the sharing node data structure associated with the respective disk blocks; and process the shared block map to identify disk blocks within the respective disk blocks associated with a single file node structure.

5. The storage management computing device of claim 4, wherein the processor is further configured to be capable of executing one or more programmed instructions comprising and stored in the memory to:

update the shared block map when one of two or more cloned files are edited, wherein the updated shared block map comprises sharing node data structure identifiers associated with the sharing node data structure associated with the respective disk blocks used by the edited one of two or more cloned file files.

6. The storage management computing device of claim 4, wherein the processor is further configured to be capable of executing programmed instructions comprising and stored in the memory to:

update the shared block map when deduplicating the at least one file, wherein the updating comprises:
 removing the sharing node data structure identifiers associated with duplicate disk blocks; and
 adding the sharing node data structure identifiers associated with the sharing node data structure associated with the respective disk blocks used by an edited deduplicated file.

7. The storage management computing device of claim 4, wherein the processor is further configured to be capable of executing one or more programmed instructions comprising and stored in the memory to;

process the shared block map to identify disk blocks within the respective disk blocks that are not associated with a single file node structure delete the identified disk blocks within the respective disk blocks that are not associated with a single file node structure by iterating through the shared block map.

8. A method of storage processing comprising:

associating, by a storage management computing device, file node data structures with at least one file in a file system, the file node data structures comprising information on respective disk blocks in use by the at least one file;

generating, by the storage management computing device, a sharing node data structure in the file system, the sharing node data structure directly associated with the respective disk blocks and the file node data structures, and comprising information on a relationship between the file node data structures and the associated respective disk blocks;

detecting, by the storage management computing device, an allocation in the file system of the respective disk blocks associated with the file node data structures; and mapping, by the storage management computing device, the respective disk blocks to the file node data structures associated with the respective disk blocks by using the sharing node data structure when the allocation is detected.

9. The method of claim 8, further comprising detecting, by the storage management computing device, a cloning operation carried out on the file node data structures; and generating, by the storage management computing device, two sharing node data structures associated with the file node data structures when the cloning operation is detected, wherein the two generated sharing node data structures comprise the same parent sharing node data structure or the same associated respective disk blocks.

10. The method of claim 8, further comprising:

generating, by the storage management computing device, a shared block map comprising information representative of the respective disk blocks and the associated sharing node data structure for the respective disk blocks.

11. The method of claim 10, further comprising:

updating, by the storage management computing device, the shared block map when one of two or more cloned files are edited, wherein the updated shared block map comprises sharing node data structure identifiers associated with the sharing node data structure associated with the respective disk blocks used by the edited one of two or more cloned files.

12. The method of claim 10, further comprising:

processing, by the storage management computing device, the shared node map to identify disk blocks within the respective disk blocks that are not associated with a single file node structure; and deleting, by the storage management computing device, the identified disk blocks within the respective disk blocks that are not associated with a single file node structure by iterating through the shared block map.

13. The method of claim 10, further comprising:

updating, by the storage management computing device, the shared block map when deduplicating the at least one file, wherein the updating comprises:
 removing, by the storage management computing device, the sharing node data structure identifiers associated with duplicate disk blocks; and
 adding, by the storage management computing device, the sharing node data structure identifiers associated with the sharing node data structure associated with the respective disk blocks used by an edited deduplicated file.

14. The method of claim 8, further comprising:

generating, by the storage management computing device, internal sharing node data structures pointed to by the respective disk blocks, and leaf sharing node data structures comprising pointers for pointing to the file node data structures; and connecting the internal sharing node data structure and the leaf sharing node data structure into a tree linking the respective disk blocks with the file node data structures.

15. A non-transitory computer readable medium having stored thereon instructions for storage processing comprising machine executable code which when executed by a processor, causes the processor to perform steps comprising:

associating file node data structures with at least one file in a file system, the file node data structures comprising information on respective disk blocks in use by the at least one file;

generating a sharing node data structure in the file system, the sharing node data structure directly associated with the respective disk blocks and the file node data structures, and comprising information on a relationship between the file node data structures and the associated respective disk blocks;

detecting an allocation in the file system of at least one of the respective disk blocks associated with the file node data structures; and mapping the respective disk blocks to the file node data structures associated with the respective disk blocks by using the sharing node data structure when the allocation is detected.

16. The medium of claim 15, further having stored thereon instructions that when executed by the processor cause the processor to perform steps further comprising generating a shared block map comprising information representative of the respective disk blocks and the sharing node data structure associated with the representative disk.

17. The medium of claim 16, further having stored thereon instructions that when executed by the processor cause the processor to perform steps further comprising:

update the shared block map when one of two or more cloned files are edited, wherein the updated shared block map comprises sharing node data structure identifiers associated with the sharing node data structure associated with the respective disk blocks used by the edited one of two or more cloned files.

18. The medium of claim 16, further having stored thereon instructions that when executed by the processor cause the processor to perform steps further comprising:

updating the shared block map when deduplicating the at least one file, wherein the updating comprises:

removing the sharing node data structure identifiers associated with duplicate disk blocks; and adding the sharing node data structure identifiers associated with the sharing node data structure associated with the respective disk blocks used by an edited deduplicated file.

19. The medium of claim 16, further having stored thereon instructions that when executed by the processor cause the processor to perform steps further comprising:

processing the shared block map to identify disk blocks within the respective disk blocks that are not associated with a single file node structure deleting the identified disk blocks within the respective disk blocks that are not associated with a single file node structure by iterating through the shared block map.

20. The medium of claim 15, further having stored thereon instructions that when executed by the processor cause the processor to perform steps further comprising generate internal sharing node data structures pointed to by the respective disk blocks, and leaf sharing node data structures comprising pointers for pointing to the file node data structures; and connect the internal sharing node data structures and the leaf sharing node data structures into a tree linking the respective disk blocks with the file node data structures.

21. The medium of claim 15, further having stored thereon instructions that when executed by the processor cause the processor to perform steps further comprising:

detecting a cloning operation carried out on the file node data structures; and generating two sharing node data structures when the cloning operation is detected, wherein the two generated sharing node data structures comprise the same parent sharing node data structure or the same respective disk blocks.

* * * * *